(12) United States Patent
Cole et al.

(10) Patent No.: US 8,938,416 B1
(45) Date of Patent: Jan. 20, 2015

(54) DISTRIBUTED STORAGE OF AGGREGATED DATA

(75) Inventors: Richard J. Cole, Seattle, WA (US); Alan D. Mock, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 149 days.

(21) Appl. No.: 13/350,653

(22) Filed: Jan. 13, 2012

(51) Int. Cl.
*G06F 17/00* (2006.01)
*G06F 17/30* (2006.01)

(52) U.S. Cl.
CPC ............................ *G06F 17/30592* (2013.01)
USPC ........................................ 707/607; 707/747

(58) Field of Classification Search
CPC .................. G06F 17/30563; G06F 17/30592
USPC .............. 707/607, 99.1, 999.1, 999.001, 687, 707/747
See application file for complete search history.

(56) References Cited

U.S. PATENT DOCUMENTS

| | | | | |
|---|---|---|---|---|
| 6,094,651 A * | 7/2000 | Agrawal et al. .................... | 1/1 |
| 6,581,068 B1 * | 6/2003 | Bensoussan et al. ............... | 1/1 |
| 6,829,621 B2 * | 12/2004 | Keller ............................ | 707/812 |
| 7,340,476 B2 * | 3/2008 | Arras et al. ..................... | 707/752 |
| 7,587,410 B2 * | 9/2009 | Sourov et al. ................... | 1/1 |
| 7,822,712 B1 * | 10/2010 | Robinson et al. ................. | 707/624 |
| 8,001,112 B2 | 8/2011 | Dombroski et al. ............... | 707/718 |
| 8,214,321 B2 * | 7/2012 | Schmitt .......................... | 707/600 |
| 8,219,547 B2 * | 7/2012 | Joseph et al. ................... | 707/717 |
| 8,321,454 B2 * | 11/2012 | Berlyant et al. ................ | 707/770 |
| 8,344,916 B2 * | 1/2013 | Lin et al. ....................... | 341/87 |
| 8,462,665 B2 * | 6/2013 | Tabbara et al. .................. | 370/254 |
| 2004/0243539 A1 * | 12/2004 | Skurtovich et al. ............... | 707/1 |
| 2005/0071320 A1 * | 3/2005 | Chkodrov et al. ................ | 707/3 |
| 2006/0085444 A1 * | 4/2006 | Sarawgi et al. ................. | 707/100 |
| 2009/0012919 A1 * | 1/2009 | Crivat et al. ................... | 706/12 |
| 2009/0150426 A1 * | 6/2009 | Cannon et al. .................. | 707/102 |
| 2009/0287666 A1 * | 11/2009 | Dekimpe et al. ................. | 707/4 |
| 2010/0325142 A1 * | 12/2010 | Anzalone et al. ............... | 707/769 |
| 2011/0047172 A1 * | 2/2011 | Chen et al. ..................... | 707/764 |
| 2011/0055146 A1 * | 3/2011 | Mahajan et al. ................. | 707/600 |
| 2011/0131173 A1 * | 6/2011 | Fernandez Ortega ............ | 707/602 |
| 2011/0208690 A1 * | 8/2011 | Cushing et al. ................. | 707/602 |
| 2011/0213751 A1 * | 9/2011 | Iorio et al. ..................... | 707/602 |
| 2011/0231359 A1 * | 9/2011 | Lerwich et al. ................. | 707/600 |
| 2012/0254000 A1 * | 10/2012 | Ryzhikov et al. ............... | 705/34 |
| 2012/0254193 A1 * | 10/2012 | Chattopadhyay et al. ....... | 707/747 |

OTHER PUBLICATIONS

"MicroStrategy 9: FAQ," retrieved on Jan. 5, 2012, from http://www.microstrategy.com/9/faq.asp, 8 pages.

(Continued)

*Primary Examiner* — Miranda Le
(74) *Attorney, Agent, or Firm* — Seed IP Law Group PLLC

(57) ABSTRACT

Techniques are described for managing aggregation of data in a distributed manner, such as for a particular client based on specified configuration information. The described techniques may include storing aggregated data values for an OLAP cube or other data structure in a distributed manner, such as in some situations in a distributed hash table. The aggregated data values to be stored may be generated in various manners, such as by performing multi-stage data manipulation operations—for example, a map-reduce architecture may be used, with a first stage involving the use of one or more specified map functions to be performed, and with at least a second stage involving the use of one or more specified reduce functions to be performed.

26 Claims, 16 Drawing Sheets

(56) References Cited

OTHER PUBLICATIONS

"MicroStrategy OLAP Services FAQs," retrieved on Jan. 5, 2012, from http://www.microstrategy.com/Software/Products/Service_Modules/OLAP_Services/faqs.asp, 3 pages.

"MicroStrategy OLAP Services Overview," retrieved on Jan. 5, 2012, from http://www.microstrategy.com/Software/Products/Service_Modules/OLAP_Services/, 2 pages.

Beaver, J. et al., "Tracking and Reporting Account Referral Activity using Hash Tables and SAS BI," 2011 SCSUG Educational Forum, retrieved on Jan. 5, 2012, 9 pages.

Niemi, T. et al., "Applying Grid Technologies to XML Based OLAP Cube Construction," Dec. 17, 2002, retrieved on Jan. 5, 2012, from http://cdsweb/cern.ch/record/600552, 25 pages.

\* cited by examiner

Example Transaction Data and Data Aggregation Definition

| | 207b | 207c | 207d | 207e | 207f | 207g |
|---|---|---|---|---|---|---|
| 207a Transaction ID | Sales Date | Sales Price | State Of Sale | Customer ID | Customer Age | Customer Gender |
| 206a T1 | 01/03/XX | $23 | CA | C1 | 19 | male |
| 206b T2 | 01/03/XX | $8 | WA | C2 | 25 | female |
| 206c T3 | 01/03/XX | $58 | VT | C3 | 34 | male |
| 206d T4 | 01/04/XX | $12 | WA | C2 | 25 | female |
| 206e T5 | 01/04/XX | $19 | KS | C4 | 62 | female |
| 206f T6 | 01/05/XX | $30 | WA | C5 | 42 | female |
| ⋮ | | | | | | |
| 206g TN-2 | 01/09/XX | $100 | WA | C6 | 26 | male |
| 206h TN-1 | 01/09/XX | $118 | WA | C7 | 18 | male |
| 206i TN | 01/09/XX | $23 | CA | C1 | 19 | male |
| ⋮ | | | | | | |

205 metric-1 – cumulative sum of Sales Price
dimension categories:
   Sales Date – Jan 20XX, Feb 20XX, Mar 20XX, ... Dec 20XX, <all>
   State Of Sale – AL, AK, AZ, AR, CA, ... WA, WV, WI, WY, <all>
   Customer Age – 0-17, 18-25, 26-50, 51-65, 66+, <all>
alpha-1 map function – extract Sales Price by combinations of dimension categories
beta-1 reduce function – sum extracted Sales Price by combinations of dimension categories

DISTRIBUTED STORAGE OF AGGREGATED DATA

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or shared intermediate networks). Such groups of interconnected computing systems are increasingly useful for various reasons, including to support increasingly large input data sets and associated data manipulation tasks that may be distributed across multiple computing systems. For example, data centers housing significant numbers of interconnected co-located computing systems have become commonplace, such as private data centers that are operated by and on behalf of a single organization, and public data centers that are operated by entities as businesses to provide computing resources to customers. However, the task of provisioning, administering, and managing data manipulation tasks for increasingly large input data sets and the associated physical computing resources has become increasingly complicated.

BRIEF DESCRIPTION OF THE DRAWINGS

FIGS. 2A-2H illustrate examples of managing distributed data aggregation tasks on multiple computing nodes.

DETAILED DESCRIPTION

Figure 1:
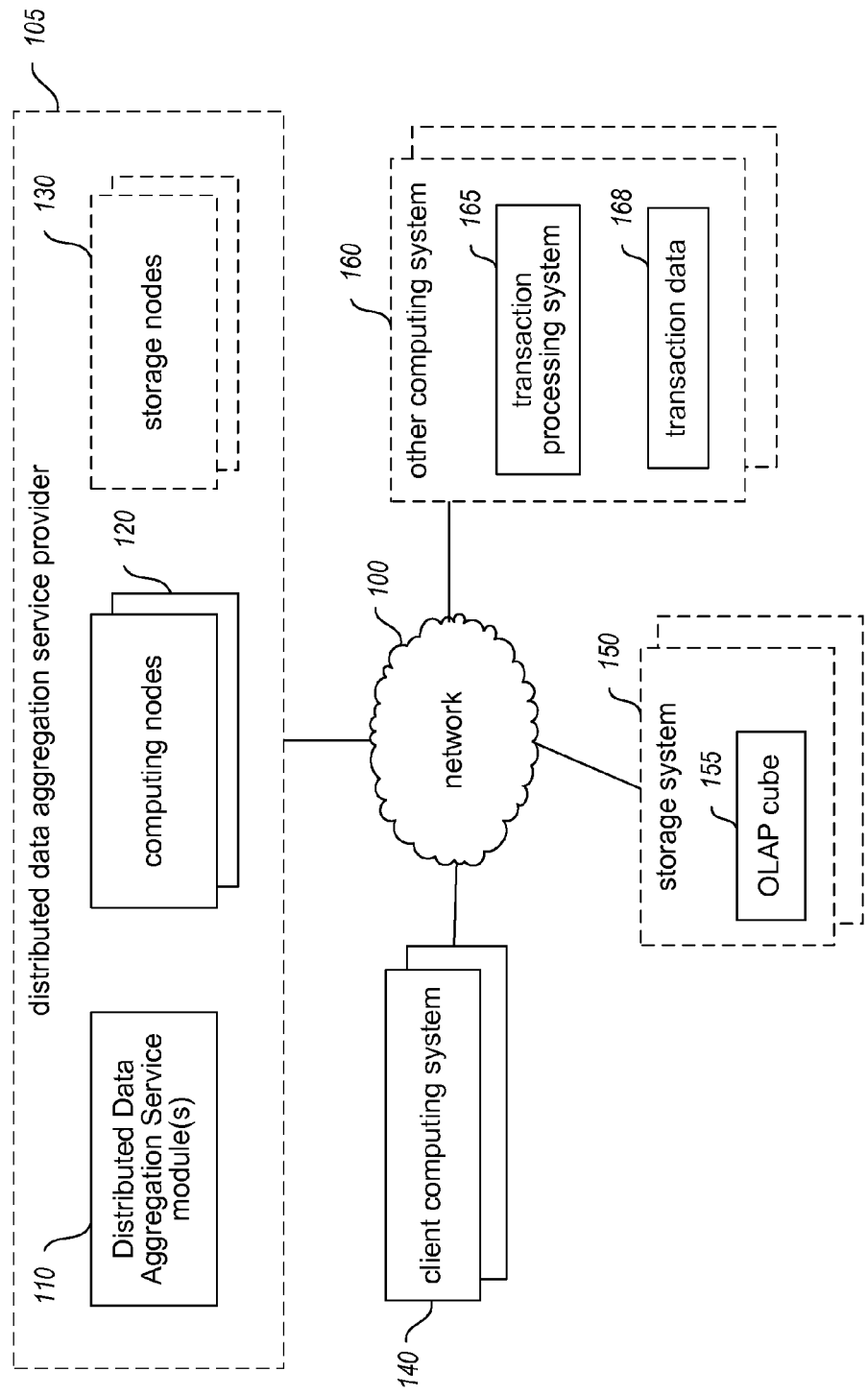
FIG. 1 is a network diagram illustrating example embodiments of use of a distributed data aggregation service by remote clients.

Techniques are described for managing the aggregation of data in a distributed manner, such as based on configuration information specified by a client. In at least some embodiments, the described techniques include receiving information about multi-stage data manipulation operations that are to be performed as part of the data aggregation processing, with each stage able to be performed in a distributed manner using multiple computing nodes. The described techniques may be used within a map-reduce architecture in some embodiments, with a first stage involving the use of one or more specified map functions to be performed, and with at least a second stage involving the use of one or more specified reduce functions to be performed. As one example of use of the distributed data aggregation techniques, a particular set of input data may be used to generate aggregated data to include in a multi-dimensional OLAP ("online analytical processing") cube, such as for input data corresponding to a large quantity of transactions of one or more types. In addition, in at least some embodiments, an OLAP cube or other multi-dimensional data structure that holds aggregated data may be stored in a distributed manner, such as via a distributed hash table or other distributed storage structure. Additional details related to the described techniques for managing aggregation of data in a distributed manner are included below.

In at least some embodiments, some or all of the described techniques may be performed by automated operations of a Distributed Data Aggregation ("DDA") service, as described in greater detail below, such as a service that is provided by a corresponding automated system and that performs configured types of data aggregation operations on behalf of multiple customers or other clients of the service. Such a DDA service may use one or more configured computing systems (e.g., computing systems programmed with corresponding software instructions and/or loaded with corresponding data structures) to manage the data aggregation operations, such as to control the performance of particular data manipulation operations on particular computing nodes, and/or to control the storage of particular aggregated data on particular storage nodes. In addition, the DDA service may in some embodiments provide various computing nodes having access to various computing resources (e.g., local memory, local storage, local CPU cycles, networks between computing nodes and to external computing systems, remote storage, etc.) that are available for use in performing data aggregation operations for clients in a distributed manner, and/or may provide various storage nodes (whether separate from or the same as provided computing nodes) for use in storing aggregated data in a distributed manner. A particular group of computing nodes may be selected and used as part of a cluster for the distributed aggregation of data for a particular client in some embodiments. Similarly, a particular group of storage nodes may be selected and used in some embodiments to store aggregated data for a particular client. In other embodiments, an embodiment of a DDA service may be operated on behalf of a single client, such as with the computing systems, computing nodes and/or storage nodes of the DDA service being provided by and controlled by that client.

As previously noted, a multi-stage manipulation of data may be performed as part of the data aggregation operations, including in at least some embodiments to use a map-reduce architecture. For example, the multi-stage data manipulation may use the MapReduce program for processing and generating large data sets by performing at least a first stage of specified map functions and a second stage of specified reduce functions, or may use the related Hadoop program implementation of a map-reduce architecture. When using such a multi-stage architecture, the data output from a first stage may serve as intermediate results that provide at least some of the input for the second stage. Similarly, if three or more stages are in use, the second stage (and any other intermediate stages) may similarly produce output that includes intermediate results for use by later stages. In addition, in at least some embodiments, the multi-stage data manipulation may, for example, use one or more of the HDFS ("Hadoop Distributed File System") data storage system, the Hive data warehouse infrastructure that uses Hadoop, the Pig structured query language for use with HDFS data, the HBase open-source distributed database, the BigTable distributed database, etc. When performing the multi-stage data manipulation operations, the data manipulation operations may be separated into multiple execution jobs that are each executed on one of multiple computing nodes of a cluster (e.g., to support task parallelism and/or data parallelism), such as with each execution job corresponding to performing a particular map function or reduce function on a specified subset of input data, and optionally with input-output dependencies between particular execution jobs. Additional details related to the MapReduce program are included in "MapReduce: Simplified Data Processing on Large Clusters" by Jeffrey Dean and Sanjay Ghemawat, December 2004, Proceedings of OSDI'04: Sixth Symposium on Operating System Design and Implementation, which is incorporated herein by reference in its entirety, and which is also available at the time of application filing at usenix<dot>org<slash>events<slash>osdi04<slash>tech<slash>full_papers<slash>dean<slash>dean<dot>pdf (where "<dot>" and "<slash>" are replaced with corresponding characters "." and "/").

In some embodiments, the multi-stage data manipulation techniques are used to generate the data for a multi-dimensional OLAP cube, such as for input data corresponding to a large quantity of transactions of one or more types. An OLAP cube (also referred to as a "multidimensional cube") enables the pre-calculation of various types of data aggregations of interest. In particular, the input data to be aggregated is provided as fact records, which each typically represents a group of data having values for multiple data fields, such as to correspond to a single transaction. One or more metrics may then be specified for an OLAP cube to be generated, which each specifies one or more types of data aggregation operations to be performed—for example, if one of the data fields corresponds to a quantity of items for a transaction (e.g., a quantity of items that are purchased, ordered, shipped, etc.), a specified metric may include summing the quantities to determine a total quantity of items for all of the transactions in a set of input data. Furthermore, two or more dimensions may be specified for the OLAP cube, which each may correspond to one or more of the data fields and include multiple possible category values. For example, if one hundred different types of items are available, one specified dimension may be item type—if so, the possible category values may include all one hundred particular item types, so that the total quantity of items aggregated for the set of input data may be separately determined for each item type (e.g., a first total quantity of items of type one, a second total quantity of items of type two, etc.). Another specified dimension, whether instead of or in addition to the item type dimension, may be by higher-level item departments, which might include eight different departments or groupings by which the one hundred item types are organized—if so, the possible category values may include the eight particular departments, so that the total quantity of items aggregated for the set of input data may be separately determined for each department. Yet another specified dimension may correspond to multiple data fields, such as high-level item departments and item shipping locations—if so, this dimension may have multiple possible category values that each corresponds to a distinct combination of an item department and an item shipping location. In addition, each dimension may automatically be given at least one additional category value to use to facilitate the data aggregation operations, such as a total category (also referred to a "top" category herein) that includes all of the other categories for that dimension. Various other dimensions may similarly be specified, and additional details related to the generation of OLAP cubes and other multi-dimensional data structures are included below, including with respect to the examples described in FIGS. 2A-2G.

In addition, in at least some embodiments, an OLAP cube or other data structure to hold aggregated data may be stored in a distributed manner, such as via a distributed hash table spread over multiple storage nodes, or via another type of distributed storage structure that is spread over multiple storage nodes and able to store information about key-value pairs (referred to generally herein as a "distributed key-value storage structure"). In particular, a distributed hash table or other distributed key-value storage structure may be stored over a group of multiple storage nodes, whether storage nodes provided by the distributed data aggregation service or available externally to the distributed data aggregation service. When using a distributed hash table, a particular group of data is stored based on associating a key with that group of data, which when provided to a hash algorithm identifies a storage location on one of the multiple storage nodes. At least some of the group of data is then stored at that identified location, such as an aggregated data value corresponding to the group of data. The stored data for a particular data group may later be efficiently accessed by using the same key for that particular data group, which will identify the same storage location from which the aggregated data value and any other stored data may be retrieved. Thus, when an OLAP cube is generated for a specified metric, with respect to multiple dimensions having various dimension category values, an aggregated data value may be generated for some or all combinations of dimension category values—accordingly, a particular combination of dimension category values may be used as a key to identify a storage location where the corresponding aggregated data value is stored. When an OLAP cube is generated for multiple specified metrics, an aggregated data value may be generated for each metric and for some or all combinations of dimension category values, and the key may include a particular combination of dimension category values and an indication of a particular corresponding metric. Additional details related to the storage of OLAP cubes or other multi-dimensional data structures in a distributed hash table are included below, including with respect to the example described in FIG. 2H.

In addition, a distributed hash table or other distributed key-value storage structure in which final aggregated data values are stored may be the same as or distinct from a distributed storage system used during the data aggregation operations. For example, a cluster of computing nodes being used in distributed data aggregation may in at least some embodiments use a distributed storage system provided by some or all of those computing nodes of the cluster, such as to store input data used in the distributed data aggregation operations and/or to store output data generated by the distributed data aggregation operations (e.g., to temporarily store intermediate results executed after a first stage or intermediate stage). The distributed storage system used may have various forms in various embodiments, such as a distributed file system, a distributed database, etc., and in some embodiments may provide various mechanisms to enhance data availability (e.g., by storing multiple copies of at least some groups of data, such as to enhance the likelihood that at least one copy of a particular group of data remains available if a computing node storing another copy of that data group fails or otherwise becomes unavailable).

The use of the described techniques provides various benefits in various embodiments. For example, by performing data aggregation in the described manners, such as via a distributed multi-stage architecture, very large data sets may be efficiently processed, and additional benefits of the distributed architecture may be realized (e.g., reliability of data manipulation operations, such as via replication or transfer of particular operations between cluster computing nodes; scalability of data manipulation operations, such as by adding and/or removing computing nodes to a cluster; availability of data manipulation operations, such as by replacing unavailable computing nodes in a cluster with new computing nodes; etc.). In addition, by using a multi-stage architecture with defined types of stages, the definition of how the data aggregation is to occur may be easily specified, as described further below. Furthermore, if a distributed data aggregation service is used that supports multiple clients, such clients may be able to easily access and use the service in configured manners, such as from remote locations, and optionally without having to provide and manage any corresponding computing nodes and/or storage nodes to be used for the data aggregation. In addition, if an OLAP cube or other multi-dimensional data structure holding aggregated data is stored in a distributed hash table or other distributed key-value storage structure, various benefits of the distributed architecture may similarly be realized for the stored data (e.g., reliability of data storage, such as via replication; scalability of data storage, such as by adding and/or removing storage nodes; availability, such as by replacing unavailable storage nodes with new storage nodes; etc.).

FIG. 1 is a network diagram that illustrates an example of a DDA service that manages distributed data aggregation operations for multiple clients. For illustrative purposes, some examples and embodiments are described below in which specific types of management of distributed data aggregation are provided in specific manners, such as with specific types of input data (e.g., transaction data), specific types of data structures used to store aggregated data (e.g., OLAP cubes), specific types of distributed multi-stage operations used (e.g., via a map-reduce architecture), etc. These examples are provided for illustrative purposes and are simplified for the sake of brevity, and it will be appreciated that the inventive techniques may be used in a wide variety of other situations, some of which are described in greater detail below. For example, while clients may specify particular information about how distributed aspects are implemented (e.g., particular quantities of computing nodes to include in a cluster) in some embodiments, in other embodiments an embodiment of the DDA service may automatically initiate the distributed performance of data aggregation operations for a client (e.g., without knowledge of the client).

In the example of FIG. 1, a number of client computing systems 140 are interacting over a network 100 with an illustrated embodiment of a distributed data aggregation service that is implemented by one or more modules 110, such as to initiate distributed data aggregation operations on one or more computing nodes 120 that are available for use on behalf of the clients. While not illustrated here, each of the computing systems 140 may have one or more associated users that are associated with a particular client of the distributed data aggregation service, and that direct some or all interactions of those computing systems with the distributed data aggregation service on behalf of that client. In the illustrated embodiment, the DDA service modules 110 and the computing nodes 120 are provided by a DDA service provider 105 as part of an embodiment of a DDA service, as well as one or more optional other storage nodes 130, and the DDA service modules 110 may execute on one or more other configured computing systems (not shown).

In the illustrated embodiment, the computing systems 140 interact with the DDA service modules 110 to make requests and specify various information on behalf of particular clients. Such client requests and specifications may be made at various times, such as when a client registers to use services of the DDA service and/or at later times. For example, the DDA service modules 110 may provide registration services to one or more clients, such that a client may specify account information (e.g., client name, payment or billing information, etc.), terms of use, etc. In addition, the clients may use the computing systems 140 to interact with the DDA service modules 110 to initiate and configure information related to one or more types of data aggregation operations to perform on behalf of the client, such as by specifying particular sources of input data, particular definitions of data aggregation operations to perform, particular locations in which to store generated aggregated data, etc. The client requests may further specify when and/or how the data aggregation operations are to be performed, such as by specifying one or more preferred execution times and/or periods of execution (whether for one-time use or multiple uses, such as on a recurring periodic basis), an expiration time for the request, a selection of one of multiple priorities for the execution (e.g., with associated fees that increase with increased priority), information about one or more resource configuration types of computing nodes to use (if different types of computing nodes are available, such as with differing associated resources), etc. Furthermore, such configuration information may also optionally include details about how distributed aspects of the data aggregations are to be performed, such as by specifying a quantity of computing nodes for execution of programs, a minimum and/or maximum quantity of computing nodes to use, one or more defined scaling criteria for use in determining whether to perform subsequent dynamic scaling of the quantity of computing nodes in a cluster or other modification of the cluster computing nodes, information about one or more sources of computing nodes to use, etc.

In the illustrated embodiment, a particular client may desire that particular transaction data be aggregated in a particular manner, and may configure corresponding data aggregation operations to be performed by the distributed data aggregation service. For example, a particular client may be associated with one or more transaction processing systems 165 executing on one or more other computing systems 160, which produce various transaction data 168. As one example, the transaction processing system(s) 165 may be part of an online merchant, and the transaction data may include various fact records that each corresponds to a purchase transaction by a particular customer of the online merchant. As another example, the transaction processing system(s) 165 may be part of a Web server system for one or more Web sites, and the transaction data may be part of a Web log that includes various fact records that each corresponds to a request by a remote user to view or otherwise access a Web page or other resource from one of the Web sites. It will be appreciated that the transaction processing system(s) and transaction data may have many other forms in other embodiments.

In this example, the particular client may specify configuration information (not shown) with the distributed data aggregation service for generating one or more multi-dimensional OLAP cubes from the transaction data, such as by specifying a location of the transaction data 168, a definition for the OLAP cube(s), and optionally a location in which to store the generated OLAP cubes. In the illustrated example, the distributed data aggregation service stores the one or more generated OLAP cubes 155 for the particular client on one or more remote storage systems 150 that are not part of the distributed data aggregation service (e.g., storage systems that are controlled by and specified by the client, that are part of a remote online storage service that is accessible by the client, etc.), although in other embodiments the distributed data aggregation service may store such OLAP cubes instead on the storage nodes 130. As discussed in greater detail elsewhere, the storage systems 150 may in some embodiments include multiple storage nodes that implement a distributed hash table or other distributed key-value storage structure. Furthermore, in some situations, the transaction data to be aggregated may be static data that already exists and is not changing, and the generation of an OLAP cube may be performed only once. In other embodiments, the transaction data may be updated over time (e.g., to reflect new transactions that occur)—if so, the client may further specify that the distributed data aggregation service perform distributed data aggregation operations on a periodic basis (e.g., daily, weekly, monthly, etc.). In such situations, the distributed data aggregation service may be configured to, for example, initially generate one or more OLAP cubes based on a first set of data, and later generate one or more new OLAP cubes that include both old previously aggregated first transaction data and new second transaction data that is not yet aggregated, such as to replace any previously generated OLAP cubes—such a new OLAP cube may be based on, for example, all available transaction data, or instead transaction data that satisfies one or more criteria (e.g., all transaction data for the last twelve months, such as by generating a new OLAP cube each month that is a rolling summary of transactions over the preceding twelve months). Alternatively, the distributed data aggregation service may be configured to, for example, initially generate one or more OLAP cubes based on a first set of data, and later generate one or more new OLAP cubes that include just new second transaction data that was not previously aggregated, such as to supplement previously generated OLAP cubes. Additional details related to techniques for generating such OLAP cubes are included with respect to the examples of FIGS. 2A-2H, including to incrementally generate new OLAP cubes.

In some embodiments, the illustrated computing nodes 120 are provided by the DDA service provider 105 for distributed data aggregation operations on behalf of the clients, and may include multiple physical computing systems and/or multiple virtual machines that are hosted on one or more physical computing systems. Each of the computing nodes 120 has some amount of computing resources available for performing data manipulation operations (e.g., by executing one or more programs to implement, for example, one or more map functions and/or one or more reduce functions), such as may be measured, for example, by a combination of one or more of processing capacity (e.g., number and/or size of processing units), memory capacity, storage capacity, disk I/O ("input/ output") capacity, etc., and other components (not shown) provided by the DDA service may provide other computing resources (e.g., network bandwidth capacity of one or more networks, additional storage capacity of network storage devices or other storage remote from particular computing nodes, etc.).

The network 100 may have various forms, such as, for example, to be a publicly accessible network of linked networks, possibly operated by various distinct parties (e.g., the Internet). In other embodiments, the network 100 may be a private network, such as, for example, a corporate or university network that is wholly or partially inaccessible to non-privileged clients. In still other embodiments, the network 100 may include one or more private networks with access to and/or from the Internet.

In this illustrated embodiment, the DDA service provides a variety of functionality for managing distributed data aggregation operations for multiple clients on the computing nodes 120. For example, as previously noted, a particular client may use a GUI ("graphical user interface") or API ("application programming interface") provided by the modules 110 to submit a request for indicated data aggregation operations using indicated input data, optionally along with a variety of other types of configuration information. After the request for the data aggregation operations is received, the DDA service modules 110 may select which of the available computing nodes 120 to use for the requested operations in various ways. For example, in some embodiments, the modules 110 may simply select an appropriate quantity of computing nodes from any of the available computing nodes with sufficient resources, such as, for example, by randomly selecting from a single pool of available computing nodes. In other embodiments, one or more specific computing nodes may be selected on the basis of one or more other factors, such as, for example, a predicted length of and/or likelihood of continued availability of the one or more computing nodes, a physical proximity of the one or more specific computing nodes to one or more other computing nodes, a geographic location of the one or more specific computing nodes and/or of one or more other computing nodes, a resource configuration type of the computing nodes, one of multiple computing node pools or other sources of computing nodes, etc.

In addition, after the request is received, the modules 110 may further determine how to separate the indicated data aggregation operations into multiple execution jobs to be executed on some or all of the multiple selected computing nodes, such as by using information supplied by the client and/or in an automatic manner based on previously obtained information about the type of data aggregation operations and underlying data aggregation architecture. Similarly, in at least some embodiments and situations, the modules 110 may determine how to separate the indicated input data into multiple subsets for use by the multiple execution jobs. For example, in some situations, each execution job may include executing a full copy of a program implementing a particular function but on a particular subset of input data, while the other execution jobs similarly execute the full program copy functionality on other input data subsets. Alternatively, in some situations, various execution jobs may perform different functions on a single common set of input data. The modules 110 may further determine which computing nodes of a cluster execute which execution jobs in various manners, including in some situations based on the location in which input data to be used by an execution job is stored. As one example, an execution job may preferably be executed on a computing node that already stores some or all input data for the execution job in some embodiments. As another example, if the computing nodes of a cluster are located in multiple distinct geographical and/or network locations (e.g., in multiple distinct data centers), a particular execution job may in some embodiments preferably be executed on one of one or more computing nodes that are at a particular location that stores at least one copy of the input data to be used for the execution job.

As the execution jobs execute on the various computing nodes of a cluster, the execution jobs store various information locally on the computing nodes in at least some embodiments, including as part of a distributed storage system on multiple computing nodes that include local storage, as discussed in greater detail elsewhere. In addition, the DDA service may optionally provide one or more storage nodes 130 that are used by the DDA service to store information related to data aggregation operations and/or for other purposes, such as to provide a reliable backup copy of data in case one or more computing nodes of the cluster become unavailable. As discussed in greater detail elsewhere, such information stored on the storage nodes 130 may include status information regarding the intermediate state of partial execution of various execution jobs for various programs, and in some embodiments may optionally include output data that is generated by completed execution jobs.

In addition, as the execution jobs of a program execute in a distributed manner on the various computing nodes of a cluster for that program, the DDA service may automatically perform various actions to dynamically monitor and/or modify the ongoing distributed data aggregation operations. For example, the DDA service modules 110 may select which types of actions to pursue in which situations (e.g., based on predefined scaling criteria specified generally for the DDA service, or defined scaling criteria specified specifically for the data aggregation operations being performed or the client on whose behalf the data aggregation operations are being performed). For example, if the DDA service modules 110 automatically determine to dynamically add and/or remove computing nodes from the cluster, the DDA service modules 110 may further select which computing nodes to add or remove, such as in a similar manner to the selections made initially by the modules 110 in selecting particular computing nodes for the cluster.

Thus, the network diagram of FIG. 1 illustrates an example of a distributed data aggregation service that manages distributed data aggregation operations for multiple clients in configured manners. As previously noted, FIGS. 2A-2H illustrate particular examples of how distributed data aggregation tasks may be managed on multiple computing nodes.

With respect to FIG. 2A, various examples are provided of transaction data 205 that may be aggregated, and of configuration information 209 specified for a client to use in generating an OLAP cube based on the transaction data. In particular, the example transaction data includes various rows 206 that each corresponds to a distinct transaction, and specifies a fact data group including various types of data for that transaction. In this example, a variety of example columns 207 are illustrated that each represents a distinct data field. For example, with respect to the fact data group shown in row 206a, it includes a value of "T1" for a Transaction ID ("identifier") 207a, a value of "01/03/XX" for a Sales Date 207b, a value of "$23" for a Sales Price 207c, a value of "CA" for a State Of Sale 207d, a value of "C1" for a Customer ID 207e, a value of 19 for a Customer Age 207f, and a value of "male" for a Customer Gender 207g. It will be appreciated that actual transaction data may include more or less data fields and/or data fields of other types, and that actual transaction data may reflect hundreds, or thousands, or millions of different transactions.

In the example of FIG. 2A, a particular client is associated with the example transaction data 205, and has specified example configuration information 209 related to data aggregation operations to be performed based on the transaction data. In particular, in the example of FIG. 2A, the client has specified information corresponding to an OLAP cube to be generated. The configuration information 209 includes information about a particular metric to use in aggregating data (referred to in this example as "metric-1"), which in this example is a cumulative sum of the Sales Price data field 207c values. In addition, the client has specified three dimensions along which to aggregate data, which each has multiple specified aggregation category values. In this example, the three dimensions correspond to the Sales Date 207b, State Of Sale 207d and Customer Age 207f data fields, with the Sales Date data field 207b values to be aggregated by month, the State Of Sale data field 207d values to be aggregated by state, and the Customer Age data field 207f values to be aggregated by different enumerated groups of ages. In other embodiments and situations, a particular dimension may correspond to multiple associated data fields and/or may have aggregation categories that do not include all possible values for one or more associated data fields—for example, another dimension could optionally correspond to a combination of the Customer Age 207f data field and the Customer Gender 207g data field, and have multiple dimension category values of "18-25 & male", "51-66 & male", "18-25 & female" and "26-50 & female", such as if those combinations of values were the ones for which aggregated data is desired. A total (or "top") category is also automatically added in this example for each dimension by the distributed data aggregation service, represented by category name "<all>". The configuration information further includes information about map and reduce functions to be used as part of generating the desired OLAP cube using a map-reduce architecture, with the map function (referred to in this example as "alpha-1 map function) supporting the metric-1 metric and corresponding to extracting the Sales Price data field 207c values from particular fact data groups, and the reduce function (referred to in this example as "beta-1 reduce function) supporting the metric-1 metric and corresponding to summing the extracted Sales Price values for combinations of the specified categories for the three dimensions. It will be appreciated that the configuration information may be specified in various manners, including in a manual interactive fashion by a user representative of the client via a GUI of the distributed data aggregation service and/or in an automated programmatic fashion by an executing program of the client via an API of the distributed data aggregation service. In addition, the configuration information is illustrated in an abstract manner in this example to facilitate understanding, but may be specified in various manners in various embodiments (e.g., by supplying scripts or other programs to define the map and/or reduce functions; by defining how particular values for a dimension are associated with the categories for that dimension; etc.).

Figure 2B:
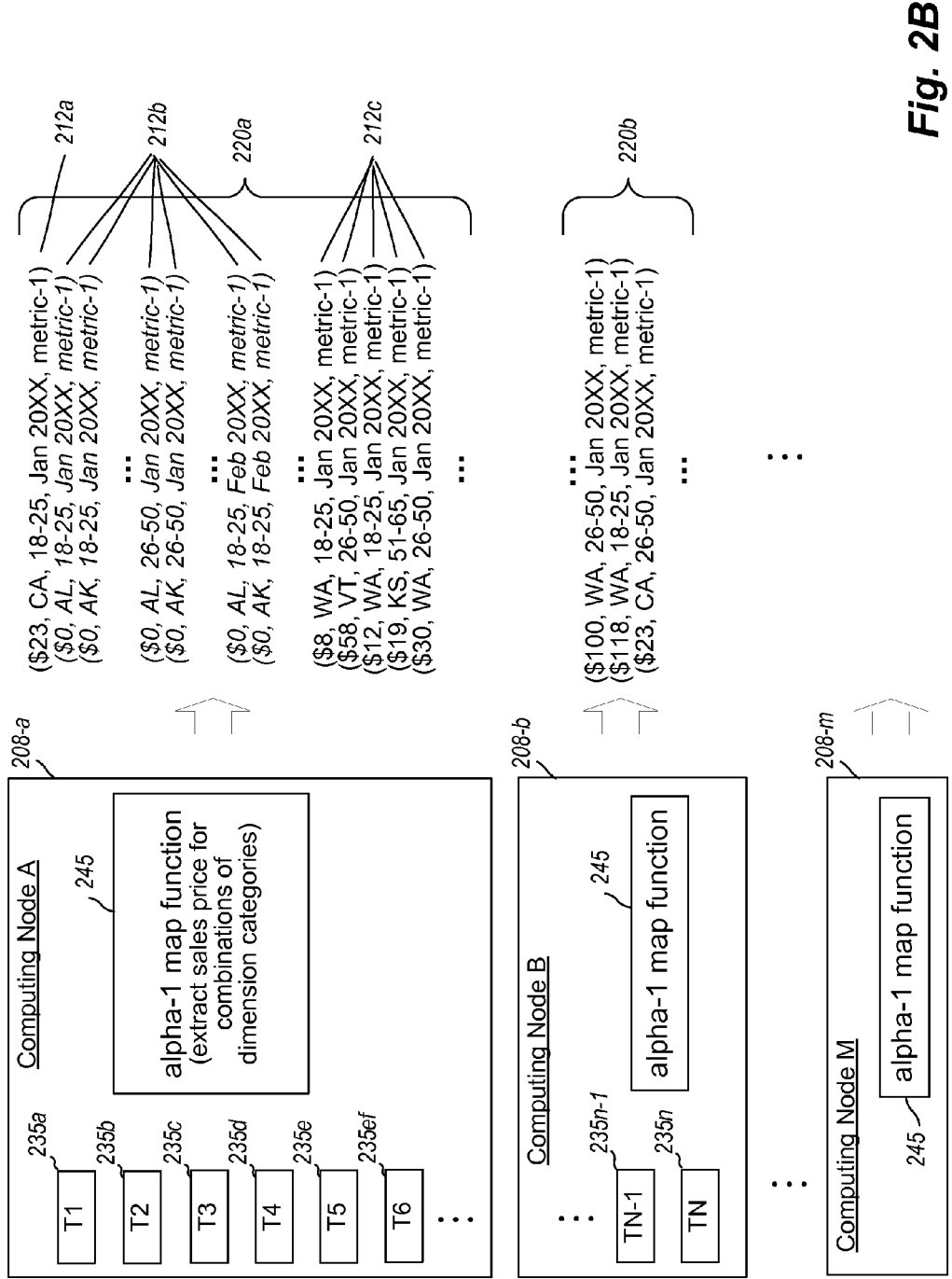

FIG. 2B continues the example of FIG. 2A, and illustrates how the specified configuration information 209 and transaction data 205 of FIG. 2A may be used during a first stage of data manipulation operations as part of the data aggregation to generate an OLAP cube. In particular, in the example of FIG. 2B, various computing nodes 208 have been selected to be part of a cluster for the client, and have been configured to execute an alpha-1 map function 245 as described with respect to FIG. 2A. In addition, in this example, each computing node 208 has been assigned a distinct set of input data, with example computing node 208-a being assigned at least the transactions with IDs of "T1" through "T6" (corresponding to rows 206a-206f of FIG. 2A), and with example computing node 208-b being assigned at least the transactions with IDs of "TN−1" through "TN" (corresponding to rows 206h-206i of FIG. 2A). The fact data group for each input transaction is loaded onto the node that will use it in this example, as represented by the fact data groups 235a-235n, although in other embodiments the computing nodes may access the fact data groups from remote storage (e.g., a distributed file system such as HDFS, in which the transaction data has been loaded). It will be appreciated that actual map functions may use large numbers of computing nodes in a distributed manner to accommodate large sets of input data.

Figure 2C:
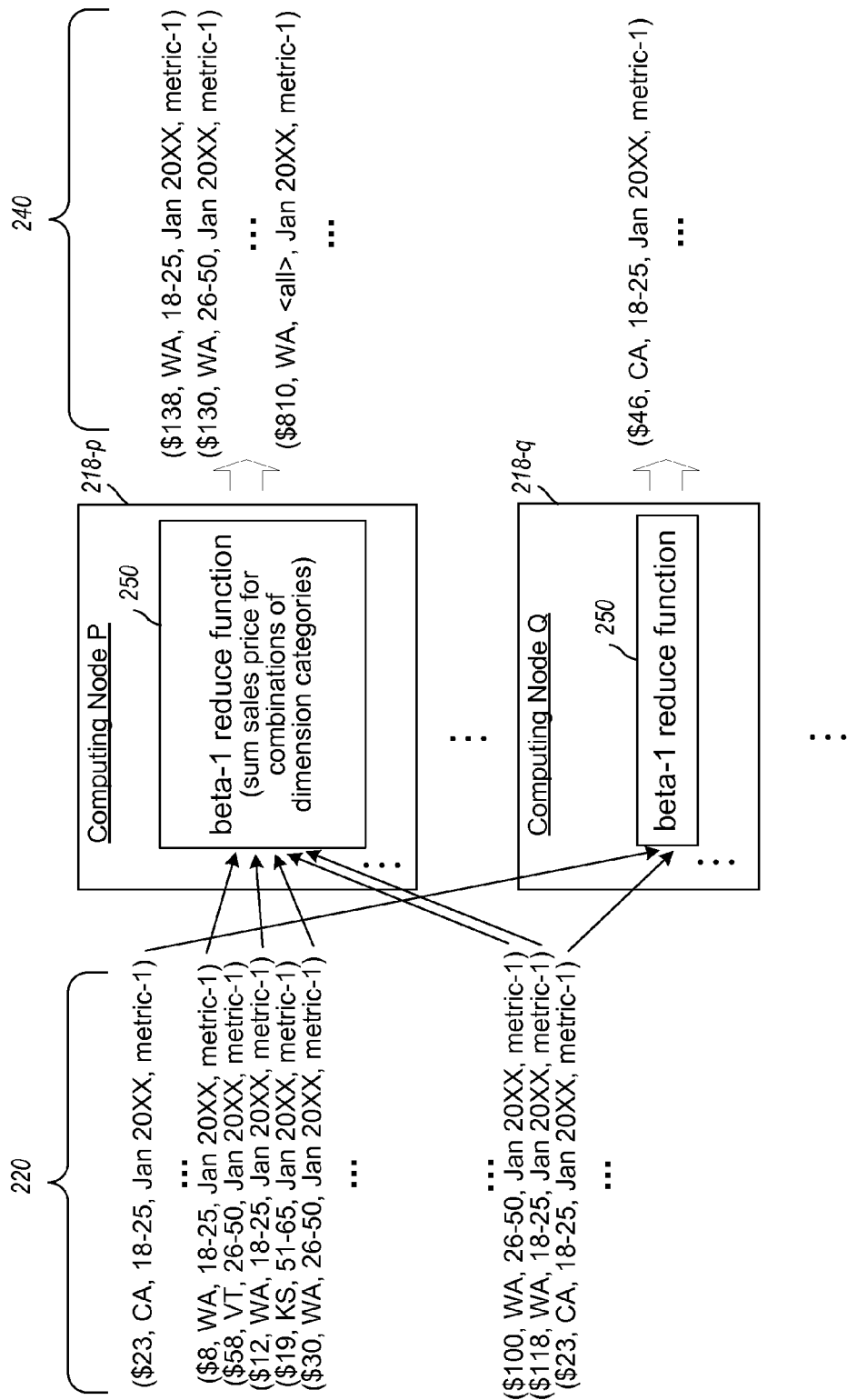

Each of the computing nodes 208 may produce output 220 from performing its map function on its assigned input data, with the output 220 serving as intermediate results that will be used as part of subsequent reduce functions (as described further with respect to FIG. 2C). In particular, in this example, the computing node 208-a may generate output 220a that includes one or more output data records 212a and 212b that correspond to the T1 fact data group 235a (and row 206a of FIG. 2A), as well as other output data records 212c that correspond to other fact data groups. In particular, the map function generates at least a first output data record 212a that includes the extracted value "$23" for the Sales Price data field 207c, three values corresponding to the combination of dimension categories for which the extracted value corresponds, and an indication of the metric-1 metric to which the alpha-1 map function 245 and resulting output data record 212a corresponds. With respect to output data record 212a, the three dimension category values are "CA" for the State Of Sale data field 207d, "18-25" for the Customer Age data field 207f, and "Jan 20XX" for the Sales Date data field 207b, based on the actual data values for this transaction (as shown in row 206a of FIG. 2A). In some embodiments, the output data records will further include a number of additional data records 212b that correspond to the T1 fact data group 235a and some or all other combinations of dimension categories, such as for the same age group and month but each other state, for other combinations of age group and month for each state, etc.—with 13 sales date categories and 51 state of sale categories and 7 customer age categories, a total of 3978 output data records may be produced for the T1 fact data group 235a. However, since the extracted sales price value will be $0 for all of the output data records 212b for the T1 fact data group 235a (since no sales occurred in that transaction corresponding to those other combinations of dimension values), the other output data records 212b may not be generated and/or output in some embodiments for efficiency reasons—thus, such $0 value output data records are not illustrated for the other transactions in this example. The other computing nodes 208 produce similar output 220 in an analogous manner, including output 220b produced by computing node 208-b. It will be appreciated that only a subset of the original transaction data may be used and reflected in the intermediate results output data 220 that is produced—as one example, the Customer Gender data field 207g is not used for the defined OLAP cube being generated in the illustrated embodiment, and thus values for that data field are not reflected in the output 220. In addition, as described in greater detail with respect to FIG. 2F, multiple reduce functions may be performed on different intermediate output results in other situations, such as for one or more different metrics to be represented in the OLAP cube being generated.

FIG. 2C continues the examples of FIGS. 2A-2B, and illustrates how the intermediate output data 220 of FIG. 2B may be used during a second stage of data manipulation operations as part of the data aggregation to generate an OLAP cube. In particular, in the example of FIG. 2C, various computing nodes 218 have been selected to be used as part of the cluster for the client, and have been configured to execute a beta-1 reduce function 250 as described with respect to FIG. 2A—the computing nodes 218 may be the same as or distinct from the computing nodes 208 discussed in FIG. 2B. In addition, in this example, each computing node 218 has been assigned one or more combinations of dimension category values (not shown) on which to operate, and obtains particular input from the intermediate output 220 corresponding to those one or more dimension category value combinations. In this example, computing node 218-p has been assigned dimension category value combinations for at least the state of Washington and the month of January 20XX and the six distinct age-group values. Thus, as is illustrated, particular intermediate output results 220 that correspond to those dimension category value combinations are provided as input to the computing node 218-p, while other intermediate output results 220 that correspond to other dimension category value combinations are provided as input to other corresponding computing nodes 218. Furthermore, since the beta-1 reduce function 250 corresponds to metric-1, only intermediate output results corresponding to metric-1 may be provided to that beta-1 reduce function 250 (and the computing nodes 218 executing that beta-1 reduce function 250), which in this example includes all of the intermediate output results 220— however, in other embodiments with multiple metrics and related reduce functions, different intermediate output results may be provided to different reduce functions, as discussed in greater detail with respect to FIG. 2F. The particular intermediate output results 220 data records that correspond to a particular computing node 218 may be provided to that computing node in various manners, such as by loading those output results data records onto the computing node 218, forwarding the output results data records to the computing node 218 from the computing nodes 208 via inter-node communications, storing the output results data records in a distributed storage system (e.g., a distributed file system such as HDFS) and having the computing node 218 retrieve it, etc.

After performing the reduce function 250 on the intermediate output results 220, the computing nodes 218 produce various output data 240. In this example, the data manipulation operations include only a two-stage analysis, and thus the output data 240 represents aggregated data that may be stored in an OLAP cube for the metric-1 metric, and later accessed and used. For example, with respect to the output data 240 generated by computing node 218-p, the first illustrated output data record indicates an aggregated sales price data value of "$138" for the combination of dimension category values of "WA", "18-25" and "Jan 20XX", such as to correspond to transactions T2, T4 and TN-1 (shown in rows 206b, 206d and 206h of FIG. 2A) with respective sales price values of "$8", "$12" and "$118". The second illustrated output data record similarly indicates an aggregated sales price data value of "$130" for the distinct combination of dimension category values of "WA", "26-50" and "Jan 20XX", such as to correspond to transactions T6 and TN-2 (shown in rows 206f and 206g of FIG. 2A) with respective sales price values of "$30" and "$100". The third illustrated output data record similarly indicates an aggregated sales price data value of "$810" for the distinct combination of dimension category values of "WA", "<all>" and "Jan 20XX", such as to include the aggregated sales price data values of "$138" and "$130" for the illustrated age groups of "18-25" and "26-50", and to include an additional "$542" (not shown) for the other age groups of "0-17", "51-65" and "66+". Illustrated computing node 218-q similarly provides aggregated data output 240, but for other combinations of dimension category values. It will be appreciated that actual reduce functions may use large numbers of computing nodes in a distributed manner to accommodate large sets of input data, and to aggregate data for each unique tuple including one of the category values from each of the three dimensions. In addition, in other situations, the number of dimensions may be more or less than three, and dimension category values may have other forms.

Figure 2D:
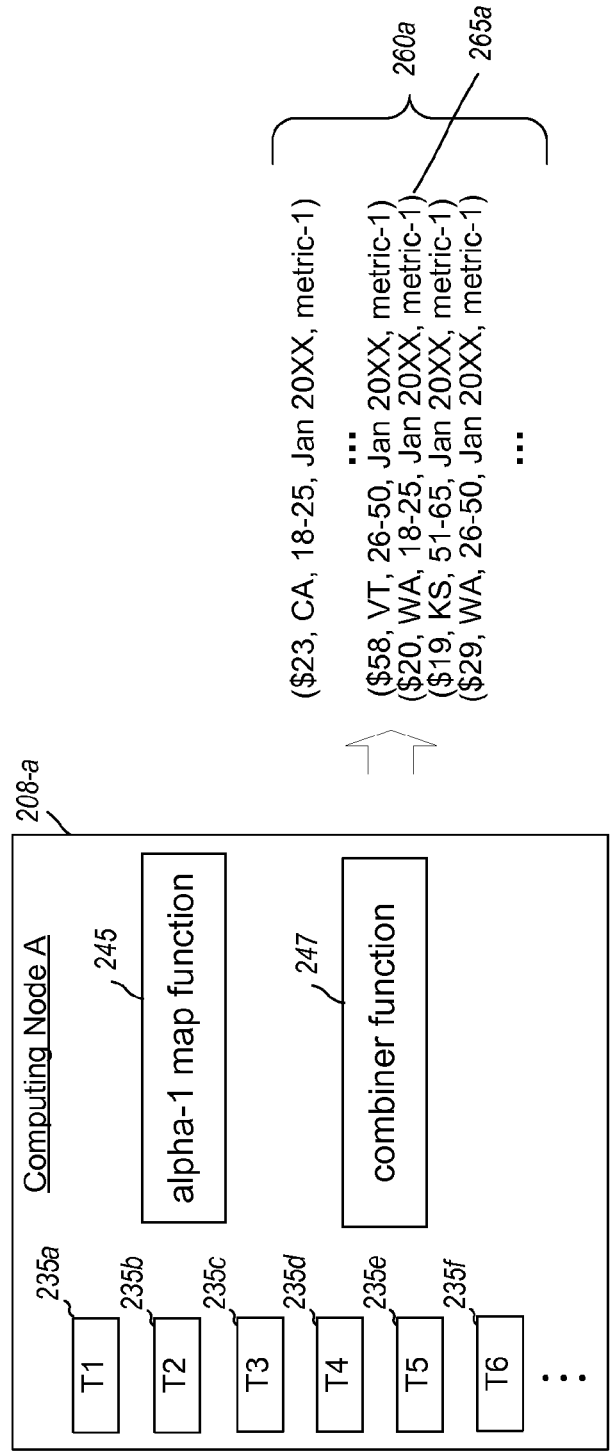

FIG. 2D continues the examples of FIGS. 2A-2C, and illustrates an alternative embodiment in which additional combiner functionality is performed by the computing nodes 208-a performing the map function 245. In particular, computing node 208-a of FIG. 2B is illustrated again, but with a combiner function 247, and alternative output 260a being produced instead of output 220a of FIG. 2B. As previously discussed with respect to FIG. 2B, various output data records may be generated that each corresponds to one of the transactions in the input data. In the example of FIG. 2B, the output records include (among others) an output record of "($8, WA, 18-25, Jan 20XX, metric-1)" corresponding to transaction T2 and an output record of "($12, WA, 18-25, Jan 20XX, metric- 1)" corresponding to transaction T4, with both of those output transaction records subsequently being supplied as input to computing node 218-*p* of FIG. 2C during a subsequent reduce stage. In FIG. 2D, after these two output records have been generated by the alpha-1 map function 245, the combiner function 247 operates to combine these two output records during the first stage and to replace them with a single aggregated intermediate output data record 265a of "($20, WA, 18-25, Jan 20XX, metric-1)". More generally, the combiner function 247 may in some embodiments be configured to combine all output data records that are generated during by the map function 245 and that correspond to a common combination of dimension category values—such combiner functionality may provide efficiency gains in situations in which many such output data values may be combined for a particular combination of dimension category values, in order to reduce the amount of intermediate output data that is stored and/or provided as input to a subsequent reduce stage of processing.

Figure 2E:
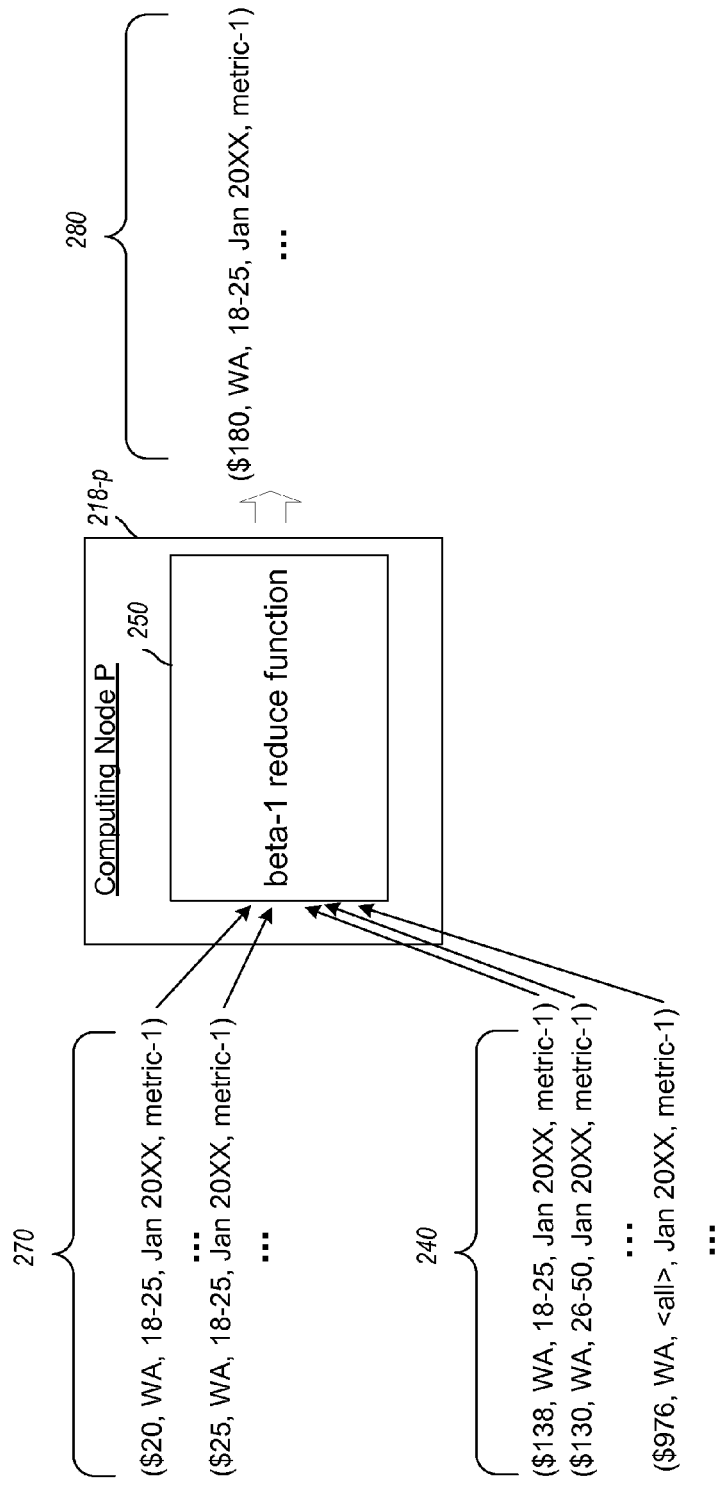

FIG. 2E continues the examples of FIGS. 2A-2D, and illustrates an alternative embodiment in which additional incremental aggregation functionality is performed by computing nodes of the cluster. In particular, computing node 218-*p* of FIG. 2C is illustrated again, but with alternative input data 270 being used instead of previous input data 220, with previous output data 240 being used as additional input data, and with alternative output 280 being produced instead of output 240 of FIG. 2C. As previously discussed with respect to FIG. 2C, various output data records 240 may be generated that represent aggregated data that may be stored in an OLAP cube and later accessed and used. In some embodiments, the data aggregation operations may be performed multiple times, such as for differing sets of input data. In particular, in the illustrated embodiment, it is desired to incrementally accumulate and aggregate sales price data for transactions that occur over time. Thus, the output data 240 in FIG. 2C may correspond to a first set of data manipulation operations that are performed at a first time for a first set of transaction data 205. The output data 240 may then be stored in a first OLAP cube, as discussed with respect to FIG. 2C. The example of FIG. 2E corresponds to a later second time when an additional second set of transactions that have occurred. While not illustrated here, the second set of transactions may pass through a first stage of processing in a manner similar to that previously discussed with respect to FIG. 2B, and with data 270 representing intermediate results output data that may be generated by computing node 208-*a* of FIG. 2B for that new second set of transactions. This output data 270 for the new second set of transactions may then be provided as input to computing node 218-*p* along with prior output data 240, with the beta-1 reduce function 250 aggregating the old and new data records from data 240 and 270 in a manner similar to that previously discussed with respect to FIG. 2C. In some embodiments, the prior output data 240 may be provided directly to the reduce function 250 of computing node 218-*p* without again proceeding through a first stage of map function processing, while in other embodiments a new pass-through map function may be defined that merely forwards such old data records through the map function without altering those old data records. It will be appreciated that such incremental aggregation functionality may be performed in various manners, including in some embodiments in a continuous or near-continuous manner, and that it may be advantageously used with respect to particular types of reduce functions (e.g., mathematical operations that are associative and commutative).

Figure 2F:
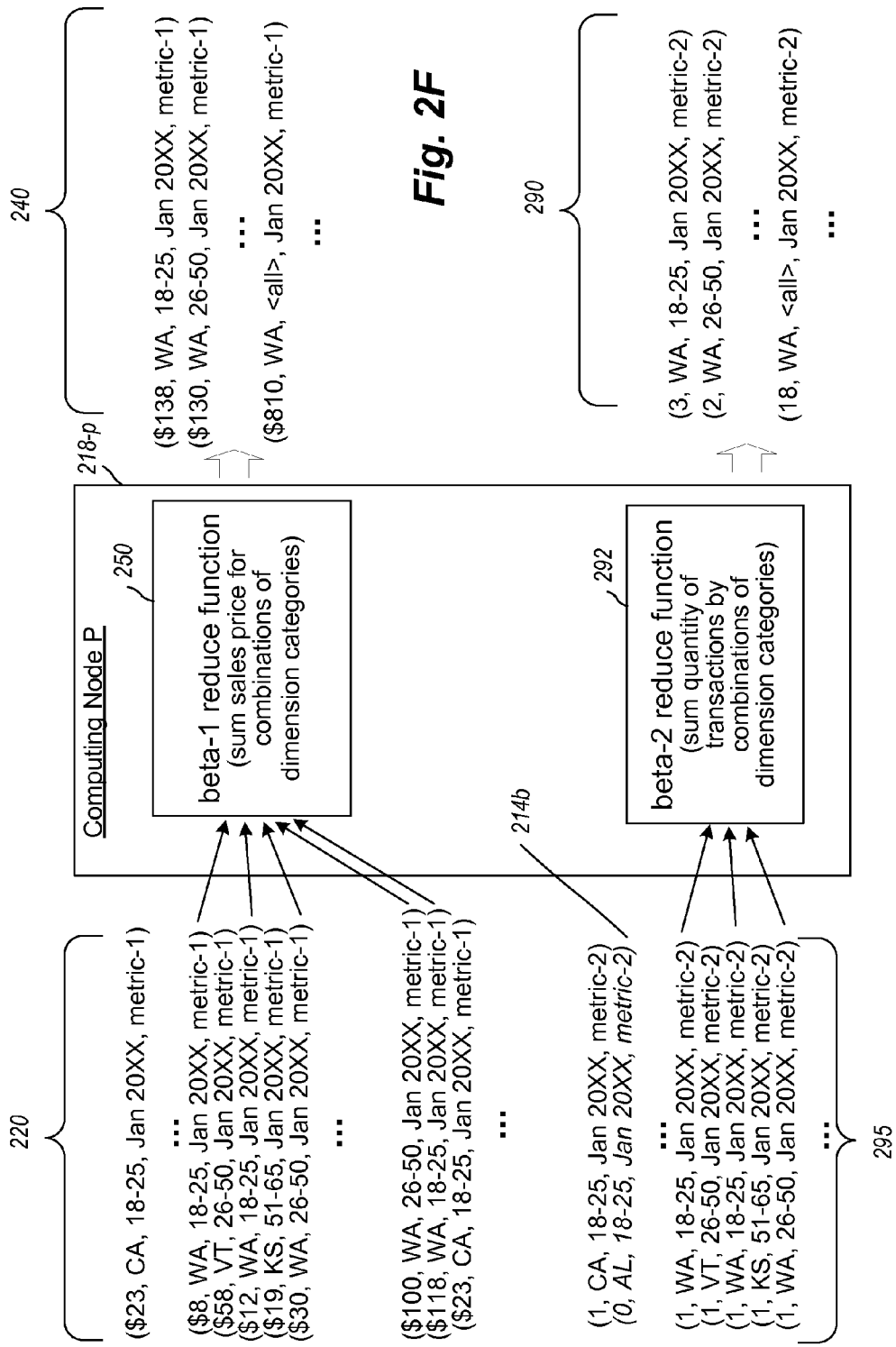
Figure 2G:
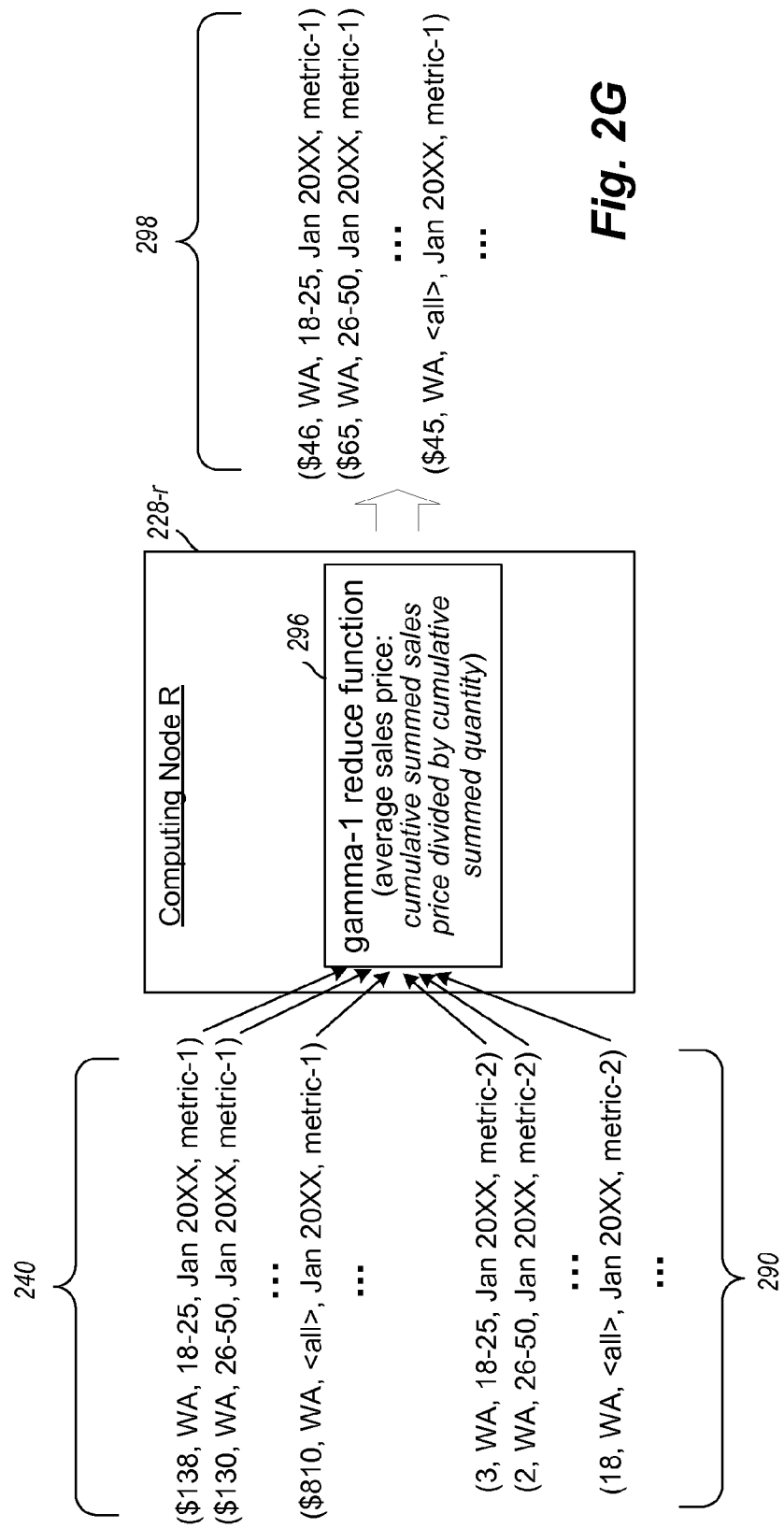

FIGS. 2F and 2G continue the examples of FIGS. 2A-2E, and illustrate an alternative embodiment in which additional reduce functions are performed by computing nodes of the cluster for an alternative type of metric. In particular, with respect to the metric of cumulative summed sale prices discussed in FIG. 2A, the metric may be determined based on use a single type of extracted value from a single data field. Consider instead an alternative metric that involves the average sales price, which may be computed using not only the cumulative summed sales price but also the total quantity of underlying transactions (to enable the average sales price to be calculated by dividing the cumulative summed sales price divided by the total quantity of corresponding underlying transactions). Accordingly, in this example, additional map and reduce functions are defined for use in generating the aggregated data for this alternative metric, with the additional new map and reduce functions being associated with a second intermediate metric referred to as "metric-2", and with the prior metric-1 now being a first intermediate metric used in combination with the second intermediate metric to calculate the new type of final metric.

With respect to FIG. 2F, computing node 218-*p* of FIG. 2C is illustrated again, with input data 220 being used by beta-1 reduce function 250 to produce output data 240. In addition, computing node 218-*p* is also using related new input data 295 for a new beta-2 reduce function 292 to produce new output data 290, although in other embodiments different computing nodes 218 may perform the beta-1 and beta-2 reduce functions 250 and 292. While not illustrated, the new input data 295 reflects intermediate results output data from a new alpha-2 map function that is similar to the previously described alpha-1 function, but that outputs a "1" data value instead of the sales price value if the sales price is non-zero and that outputs a "0" data value otherwise. In a manner similar to the data records 212b of FIG. 2B, output data records 214b in the intermediate results output data 295 that have zero data values may not be generated or otherwise included in the intermediate results output data 295. Thus, in a manner similar to the output data records in the intermediate results output data 220, the output data records in the intermediate results output data 295 each corresponds to one of the transactions 206 illustrated in FIG. 2A, and the output data records in the output data 290 each corresponds to a unique combination of dimension category values and the new second intermediate metric. For example, a first of the data records in the intermediate results output data 295 corresponds to the transaction T1 shown in row 206a of FIG. 2A, and a first of the data records in the output data 290 corresponds to an aggregation of transactions T2, T4 and TN-1 (shown in rows 206b, 206d and 206h of FIG. 2A) and the combination of dimension category values of "WA", "18-25" and "Jan 20XX".

With respect to FIG. 2G, after the output data 240 and 290 is generated during the second stage of data manipulation operations, a third stage of data manipulation operations are performed based on the output data 240 and 290. Thus, in this example, the output data 240 and 290 represents further intermediate results output data rather than final results. In particular, as illustrated in FIG. 2G, a computing node 228-*r* of the cluster is executing a new gamma-1 reduce function 296 that takes as input the intermediate results output data 240 and 290 from the beta-1 and beta-2 map functions 250 and 292 in the second stage of data manipulation operations, and that produces new final results output data 298—while these final results are illustrated in this example as being associated with an overall metric-1 metric, in other embodiments the illustrated alternative metric may be treated as a different metric (e.g., metric-3) that is based on the intermediate metric-1 and metric-2 metrics. As previously noted, this gamma-1 function determines the average sales price by dividing the aggregated summed sales price for a particular combination of dimension category values with the aggregated quantity of transactions for that combination of dimension category values, and thus is associated with both the first and second intermediate metrics. Thus, each of the data records in the final results output data 298 corresponds to a unique combination of dimension category values, and includes a data value indicating the average sales price in the set of input transactions for that combination of dimension category values. For example, for the first of the data records in the output data 298, it corresponds to the combination of dimension category values of "WA", "18-25" and "Jan 20XX", and is based on the average sales price of transactions T2, T4 and TN-1 (shown in rows 206*b*, 206*d* and 206*h* of FIG. 2A). Those three transactions have aggregated cumulative sales prices of "$138" (as shown in the first of the data records for input data 240), and have a total quantity of transactions of "3" (as shown in the first of the data records for input data 290), resulting in a mean average sales price of $46. It will be appreciated that other types of interactions between such alpha, beta and gamma functions may be defined in other embodiments, including to have more than three stages of data manipulation operations. The computing node 228-*r* may be same as or distinct from the computing nodes 208 and 218, and may include multiple such computing nodes 228 in some situations. In addition to the computing nodes 208, 218 and 228, other computing nodes may also be used for other purposes, such as to have one or more master nodes in a cluster that control operations of other computing nodes in the cluster (e.g., one or more administrative name nodes that manage where copies of particular pieces or groups of input data are stored, and one or more administrative job tracker nodes that manage the execution of particular execution jobs on particular computing nodes).

Figure 2H:
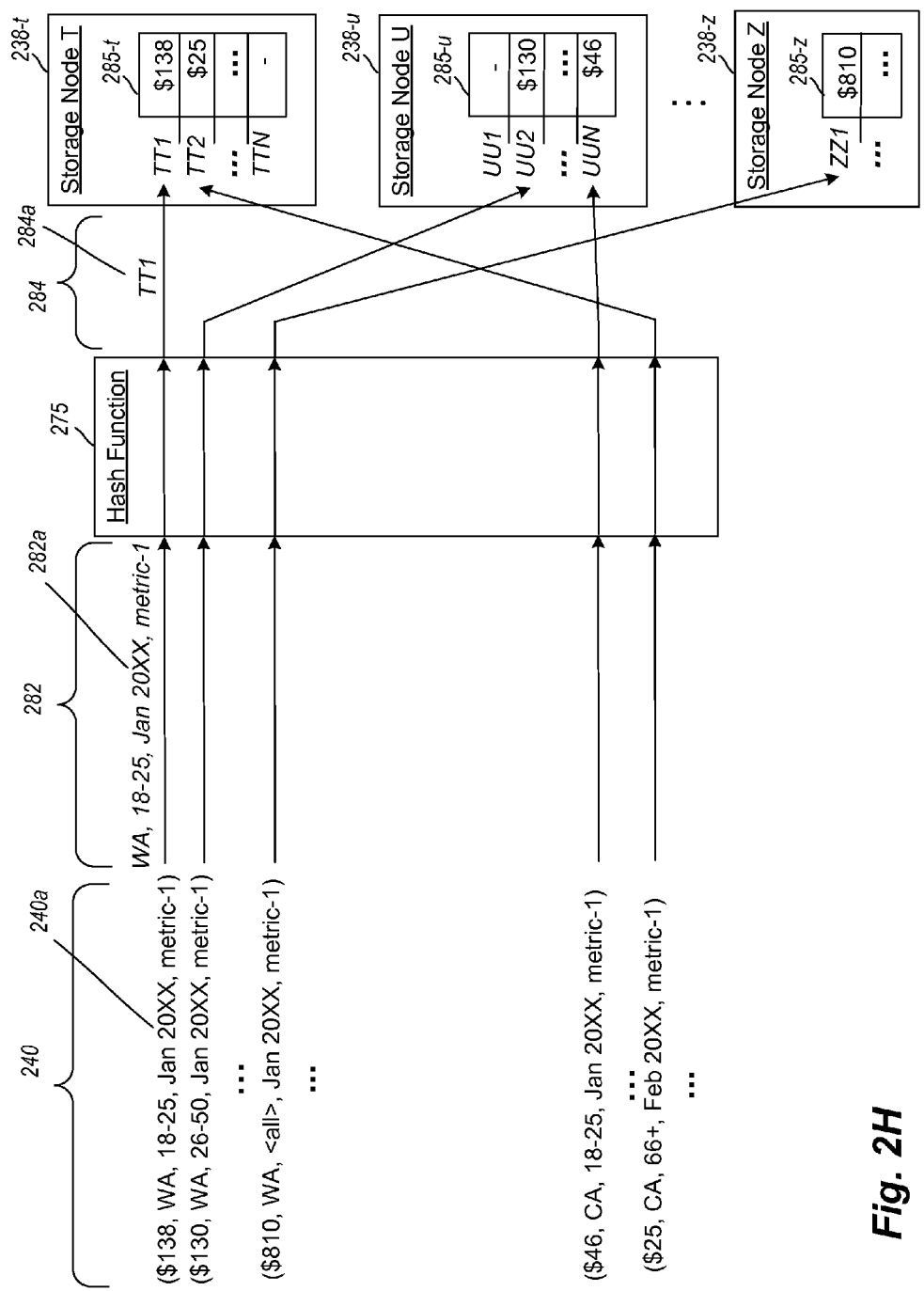

FIG. 2H continues the examples of FIGS. 2A-2E, and illustrates an example of storing aggregated data for an OLAP cube or other data structure in a distributed manner via a distributed hash table spread over multiple storage nodes. In particular, in a manner similar to that of FIG. 2C, the final aggregated data values 240 are illustrated that are output from the distributed reduce function 250 executing on the various computing nodes 218. As previously noted, the final aggregated data values 240 include a distinct data record for each combination of dimension category values and metric. Thus, for example, the final aggregated data values 240 include a first data record 240*a* that has an aggregated data value of "$138", which corresponds to the "metric-1" metric and the dimension category value combination of "WA, 18-25, Jan 20XX".

In the example of FIG. 2H, after the data records are generated for the final aggregated data values 240, each data record is applied to a hash function 275. These operations may be performed by, for example, the computing node 218 that generated the data record (e.g., computing node 218-*p* of FIG. 2C for output data record 240*a*), such as forwarding some or all of the data record to another computing node (not shown) that is executing the hash function 275 or instead by the computing node 218 also executing a copy of the hash function. In this example, a key 282 is determined for each output data record that includes all of the data record other than the aggregated data value—thus, for output data record 240*a*, the key 282*a* is "WA, 18-25, Jan 20XX, metric-1". The hash function 275 then generates a hashed output value for each key it receives, with those hashed output values being mapped to storage locations on multiple storage nodes 238. In this example, the multiple storage nodes 238 store a distributed hash table 285, with each storage node storing a portion of the distributed hash table.

Thus, for example, with respect to output data record 240*a*, its key 282*a* is used by the hash function 275 to generate a hashed output value 284*a*, which in turn is mapped to a particular storage location (referred to abstractly with label "TT1" in this example) in a portion 285-*t* of storage of storage node T 238-*t*. In this example, only the aggregated data value of "$138" for the output data record 240*a* is stored, although in other embodiments additional information may be stored (e.g., the corresponding key 282*a* for the output data record 240*a*). Other output data records in the output 240 are similarly passed through the hash function 275 and stored in the distributed hash table 285 on the storage nodes 238. For example, a second example output data record has a key that differs from that of output data record 240*a* by only one value (i.e., a customer age dimension category value of "26-50" rather than "18-25"), but is stored in the portion 285-*u* of storage node U 238-*u*, and other output data records generated by other computing nodes (e.g., computing node Q 218-*q* of FIG. 2C) may be stored on the portion 285-*t* of storage of storage node T 238-*t* or instead on a portion 285-*z* of storage of storage node Z 238-*z*. In this manner, the generated aggregated data values may be efficiently stored, and particular aggregated data values of interest may later be efficiently retrieved.

The storage nodes 238 may be same as or distinct from the computing nodes 208, 218 and/or 228, and in some embodiments the storage nodes 238 may be external to the distributed data aggregation service (e.g., be part of an online storage service, be provided by a particular client, etc.) or instead may be part of the distributed data aggregation service. In addition, in some embodiments each client may have a distinct distributed hash table in which one or more OLAP cubes or other aggregated data for that client is stored, while in other embodiments a single distributed hash table may be used to store aggregated data for multiple clients (e.g., by using client-specific identifiers or other access mechanisms to allow the aggregated data stored for a client to be accessed only by that client).

Various types of hash functions may be used in various embodiments. In some embodiments, a deterministic one-way hash function is used, such that a given key will always produce the same hashed output value, but in which the original values used for the key are not identifiable or recoverable from the hashed output value. In addition, in some embodiments a unique or cryptographic hash function is used that maps only a single key value to a resulting hashed output value (at least within a specified degree of error), so that hash collisions are minimized or eliminated in which different keys are hashed to a single hashed output value. In other embodiments, multiple distinct keys may be allowed to hash to a single hashed output value, and multiple distinct data values or data groups are stored at the storage location corresponding to that single hashed output value (e.g., in a list). A non-exclusive list of examples of hash functions that may be used include the MD5 (Message-Digest 5) algorithm, the MD6 algorithm, the SHA-1 algorithm, the SHA-2 algorithm, etc.

In addition, various types of distributed key-value storage structures may be used in various embodiments. As one example, rather than a distributed hash table, the distributed key-value storage structure may be a distributed tree structure (e.g., a binary search tree in which each node may have two children, a distributed B-tree in which each node may have more than two children, etc.). In such embodiments, multiple different input key values to the hash function may produce one or more output values that map to a particular node within the distributed tree on a particular one of multiple storage nodes storing the distributed tree, and then subsequent tree-traversal operations may be performed to select a particular leaf node corresponding to the input key value where the aggregated data value will be stored (optionally after traversing one or more intermediate non-leaf nodes that are part of a hierarchical structure of the tree). For example, different non-leaf nodes may each have an associated range or other group of hash output values, such as in an ordered manner. With respect to the example of FIG. 2H, the hashed output value 284$a$ and resulting storage location "TT1" may thus correspond to a number of different aggregated data values stored in a hierarchical manner. Extraction of data from such a distributed tree structure may be performed in an analogous manner to the insertion of data.

In addition, while not illustrated in FIG. 2H, in some embodiments additional operations may be performed to enable an efficient bulk loading of multiple aggregated data values to a single storage node at a single time. Consider, for example, an embodiment in which computing node 218-$p$ of FIG. 2C is executing a copy of the hash function 275 and performs the functionality described in FIG. 2H for the portion of the output data 240 produced by the computing node 218-$p$. In this example, multiple of the output data records in the portion of the output data 240 produced by the computing node 218-$p$ may be hashed to storage locations that are within the storage portion 285-$t$ of storage node T 238-$t$. If so, rather than individually send data for each of those multiple output data records to the storage node T, the computing node 218-$p$ may instead accumulate the information to be sent for those multiple output data records, and then send the accumulated information together at a single time to the storage node T. Such functionality may similarly be performed if a computing node other than computing node 218-$p$ is executing the hash function 275, such as if another computing node (not shown) receives some or all of the output data 240 from one or more computing nodes 218 and similarly performs such operations.

It will be appreciated that the preceding examples are provided for illustrative purposes, and that other embodiments may differ in various ways from the examples.

As noted above, when executing a particular execution job on a computing node of a cluster, information related to the execution job may be accessed and used in various manners. For example, when the execution job is initiated on a computing node, the input data to be used by the execution job may be locally stored on the computing node (e.g., on a local hard disk or other local storage device) to facilitate access to that input data during execution, and any software instructions to be executed for the execution job may similarly be locally stored on the computing node. If the computing node on which the execution job occurs already locally stores the input data to be used as part of its participation in the distributed storage system (e.g., if that computing node is selected to execute the execution job because it already locally stores that input data on a storage device of the computing node), the execution may merely include retrieving and using that input data from the distributed storage system as needed, and storing any generated results in the local portion of the distributed storage system. Alternatively, if the computing node on which the execution occurs does not already locally store the input data to be used (e.g., if the computing node is not participating in the distributed storage system), the computing node may retrieve that input data from one or more of the computing nodes of the distributed storage system that do store that input data, locally store that retrieved data temporarily on the computing node, and optionally later send any generated results data to one or more such computing nodes for storage in the distributed storage system. Furthermore, in at least some embodiments, the input data and/or generated output data in the distributed storage system may further be exchanged with or otherwise stored in one or more remote storage locations, and in some embodiments such remote storage may be used in lieu of a local distributed storage system.

A cluster of computing nodes may be dynamically modified in some embodiments and situations, including with respect to the following non-exclusive examples. The distributed execution of a program may have multiple distinct stages, and different amounts of computing resources may be desired for the different stages. As a second example, the quantity of computing nodes may be altered to correspond to an amount of input data being processed and/or to satisfy one or more specified criteria (e.g., to complete the data aggregation operations by a specified time or within a specified amount of time). It will be appreciated that a cluster may be dynamically modified while in use in various other situations and in various other manners.

In addition, the computing nodes that are available to be used in a cluster may in some embodiments and situations include computing nodes from different sources that have different characteristics (e.g., associated price for use, associated use conditions, etc.), including computing nodes supplied by the data aggregation service, computing nodes supplied by the client, and/or computing nodes supplied by other third parties (e.g., an online program execution service). In a similar manner, the storage nodes that are available to be used in a cluster may in some embodiments and situations include storage nodes from different sources that have different characteristics (e.g., associated price for use, associated use conditions, etc.), including storage nodes supplied by the data aggregation service, storage nodes supplied by the client, and/or storage nodes supplied by other third parties (e.g., an online data storage service).

In some embodiments, a user acting on behalf of a client of the DDA service may interactively specify various information for use in distributed data aggregation operations, such as via a GUI (graphical user interface) of the DDA service. Such user-specified information may include instructions to perform one or more of the following non-exclusive list: to start a cluster at the current time (or at a different specified future time) with an indicated quantity of computing nodes; to dynamically modify a cluster at the current time (or at a different specified future time) by adding and/or removing an indicated quantity of computing nodes; to perform other operations for a cluster (e.g., to suspend some or all of the execution, to resume previously suspended execution, etc.); to use one or more computing nodes of a specified resource configuration type in a specified manner, including to add and/or remove computing nodes of that type for a particular cluster; to use one or more computing nodes from a specified source in a specified manner, including to add and/or remove computing nodes from that source for a particular cluster; etc. In addition, in some embodiments, one or more scaling-related criteria may be defined for a cluster, whether by an associated client or by the DDA service, that specify particular actions to be performed if specified conditions are satisfied, including to dynamically modify a cluster by adding and/or removing an indicated quantity of computing nodes.

In some embodiments, each cluster may include at least one administrative node selected to act as a master computing node for the cluster, and the master node may gather some types of status information regarding the ongoing distributed data aggregation operations by the cluster, such as from the execution jobs executing on other cluster computing nodes (e.g., a stage of execution of an execution job, such as with respect to particular operations that are performed; an estimate of the amount of execution that has been performed and/or is remaining, such as measured by time or a percentage completeness; etc.), and if so the DDA service may automatically obtain some or all of that status information from the master node. In other embodiments, the DDA service may automatically gather other types of status information, such as directly from execution jobs executing on the cluster computing nodes, by interacting with manager modules of the DDA service that are local to various of the cluster computing nodes to determine status information for that computing node, etc. Furthermore, in at least some embodiments, the dynamic monitoring may include automatically gathering information about various types of resource usage by the distributed execution of a program on a cluster, such as resource usage specific to one or more particular cluster computing nodes and/or aggregate resource usage across the entire cluster of computing nodes. The types of resource usage that are monitored and measured may vary in various embodiments, such as to include one or more of the following non-exclusive list, and may further be measured in absolute terms (e.g., a measured quantity of use) and/or in relative terms (e.g., a percentage used of the total available, to reflect the difference between an amount used by one program and the amount used by another program, etc.): network bandwidth capacity used, such as between two or more computing nodes of the cluster or more generally for any network resources used by the DDA service; disk I/O ("input/output") capacity used for a particular cluster computing node and/or for a particular hard disk or other storage device used by one or more cluster computing nodes; amount of volatile or non-volatile memory used; amount of non-volatile storage used; amount of CPU cycles used or other measure of CPU utilization; bus bandwidth capacity specific to a particular cluster computing node; etc.

In addition, the dynamic modifying of the ongoing distributed data aggregation operations on a cluster of multiple computing nodes may be performed in various manners in various embodiments, including in some embodiments and situations based on information obtained from dynamic monitoring activities (e.g., to reflect defined scaling criteria that are satisfied, etc.). As previously noted, in some embodiments and for some types of programs, the dynamic modifying may include automatically scaling a cluster being used, such as to expand the cluster during ongoing execution by adding one or more additional computing nodes and/or to shrink the cluster during ongoing execution by removing one or more of the computing nodes from the cluster. Cluster expansion may be performed, for example, to enable data aggregation operations to complete sooner, such as if execution on one or more cluster computing nodes is taking longer than expected, if data aggregation operations are being hindered by lack of sufficient computing resources and the additional computing nodes will provide access to additional computing resources that were lacking, if a master node or other cluster computing node has failed or otherwise become unavailable and the additional computing node(s) are configured to automatically take the place of the unavailable computing nodes, if the cost of using additional computing nodes is sufficiently low (e.g., for temporarily available computing nodes, such as if their current associated price for use is below a defined threshold), etc. Cluster shrinking may be performed, for example, to more efficiently use resources, such as if the distributed data aggregation operations are progressing faster than expected, if one or more cluster computing nodes are using too many computing resources and those computing nodes are shut down to throttle the excess computing resource usage, if one or more cluster computing nodes are not currently being used (e.g., have completed their portion of the distributed data aggregation operations and are removed from the cluster so as to be available for other uses and/or to prevent the ongoing distributed data aggregation operations from being responsible for ongoing fees for the computing node if it was part of the cluster), to remove all computing nodes from a cluster if a sufficient subset of the cluster computing nodes are not available for the ongoing execution (e.g., during an initial phase of the distributed program execution if a minimum percentage of cluster computing nodes and/or a minimum absolute quantity of cluster computing nodes have not completed their initialization and begun data aggregation operations within a predetermined period of time), if the cost of using current computing nodes is sufficiently high (e.g., for temporarily available computing nodes, such as if their current associated price for use is above a defined threshold), etc.

As previously noted, various information may be locally stored on a computing node during execution of an execution job, and the locally stored information may be stored in various manners. For example, in some embodiments, a distributed file system or other distributed data store may be created on multiple computing nodes of a cluster used for distributed data aggregation operations, with a particular computing node's locally stored data being stored in the local portion of that distributed data store. Furthermore, if the distributed data store for a particular embodiment includes redundant data that allows for recovery of the data locally stored on a particular computing node that fails or otherwise becomes unavailable, then the availability of the output data from the execution of an execution job may be maintained in many situations for that embodiment even without the use of separate long-term storage for the DDA service (e.g., via one or more separate storage nodes, via a separate online storage service, etc.). In other embodiments, some or all information may be stored in other manners, such as by not using a long-term storage location of the DDA service (e.g., by maintaining locally stored data on computing nodes until all execution for the program is completed) and/or by not using local storage on the computing nodes selected to assist in the distributed execution of a program (e.g., by storing any information that is not loaded in volatile memory on the computing node at a remote location, such as the DDA service's long-term storage location).

Additional details related to enabling users to configure and modify distributed operations are included in U.S. patent application Ser. No. 12/415,649, filed Mar. 31, 2009 and entitled "Managing Distributed Execution Of Programs;" in U.S. patent application Ser. No. 12/415,725, filed Mar. 31, 2009 and entitled "Dynamically Modifying A Cluster Of Computing Nodes Used For Distributed Execution Of A Program;" and in U.S. patent application Ser. No. 12/415,773, filed Mar. 31, 2009 and entitled "Dynamically Monitoring And Modifying Distributed Execution Of Programs;" each of which is hereby incorporated by reference in its entirety.

In addition, as previously discussed, the managing of distributed operations may be performed in various manners in various embodiments. For example, the determination of which computing nodes to use for distributed operations may be made in a variety of ways, including based on any preferences and/or requirements specified in configuration information. If preferred and/or required resources for execution of a program are identified (e.g., memory and/or storage; CPU type, cycles or other performance metric; network capacity; platform type, etc.), the selection of appropriate computing nodes to use may be based at least in part on whether the computing nodes have sufficient resources available to satisfy those identified resources. In at least some situations, the initiation of the distributed operations on a cluster by the DDA service includes some or all of the following non-exclusive actions: selecting multiple computing nodes to be used as the cluster to perform the distributed operations; identifying one or more of the multiple nodes of the cluster to act as master nodes that control execution of the other nodes of the cluster; provisioning the multiple computing nodes of the cluster if needed to prepare them to receive software to be executed and input data to be used; obtaining the indicated input data to be used by the distributed operations; separating the obtained input data into multiple subsets that are each to be used on one of the multiple computing nodes of the cluster; separating the defined functionality into multiple execution jobs to be executed on the multiple computing nodes of the cluster; for each of the multiple computing nodes, loading on the computing node software and optionally input data to be used for the distributed operations (e.g., software to execute at least one execution job for the computing node and a determined subset of the indicated input data to be used by the computing node); optionally configuring loaded software on the various computing nodes (e.g., configuring the software loaded on the one or more master computing nodes to be able to use the other computing nodes of the cluster); establishing access controls for the multiple computing nodes of the cluster that enable the multiple computing nodes to inter-communicate as part of the executing of the indicated program; etc. Additional details related to executing and configuring programs to execute on a program execution service are included in pending U.S. patent application Ser. No. 11/395,463, filed Mar. 31, 2006 and entitled "Managing Execution of Programs by Multiple Computing Systems," which is hereby incorporated by reference in its entirety.

In some embodiments, fees may be associated with the use of a DDA service, such that the DDA service may perform distributed execution of programs on behalf of a client in exchange for payment of one or more fees by that client. For example, in some embodiments, fees may be charged to a client based on an amount and/or type of distributed capacity allocated on behalf of the client, such as based on one or more of the following non-exclusive list: a number of computing nodes in a cluster, a number of processing units, an amount of memory, an amount of storage, an amount of network resources, etc. In some embodiments, fees may be based on other factors, such as various characteristics of the computing resources used to execute programs, such as, for example, based on CPU capabilities or performance, platform type (e.g., 32-bit, 64-bit, etc.), etc. Fees may also be charged on the basis of a variety of use factors in some embodiments, such as a price per use of the service, a price per unit of time that computing services are used, a price per storage used, a price per data transferred in and/or out, etc. In at least some embodiments, a provider of a DDA service may offer one or more of various tiers, types and/or levels of services or functionality for distributed operations on behalf of multiple clients, and in some such embodiments, various fees may be associated with the various tiers, types and/or levels of services.

In addition, in at least some embodiments, the DDA service may provide other types of functionality in at least some situations. For example, a client may initiate distributed data aggregation operations on a cluster of multiple computing nodes, but may maintain the cluster of multiple computing nodes even after the distributed operations have ended. One reason that the user may maintain the cluster is for use in distributed data aggregation operations for data that is not static, such as if the input data continues to expand or otherwise change—one example is a log file for a Web site or data that indicates ongoing transactions, with the distributed operations analyzing each entry in the log or transaction data, such that the new log/transaction entries are analyzed as they are received (or later if the processing of the log/transaction data has not yet reached those new entries at the time of their receipt), and another example is a program performing transaction processing services for ongoing transactions.

Furthermore, various other types of functionality may be provided and used by a DDA service in various embodiments, as discussed in greater detail elsewhere.

Figure 3:
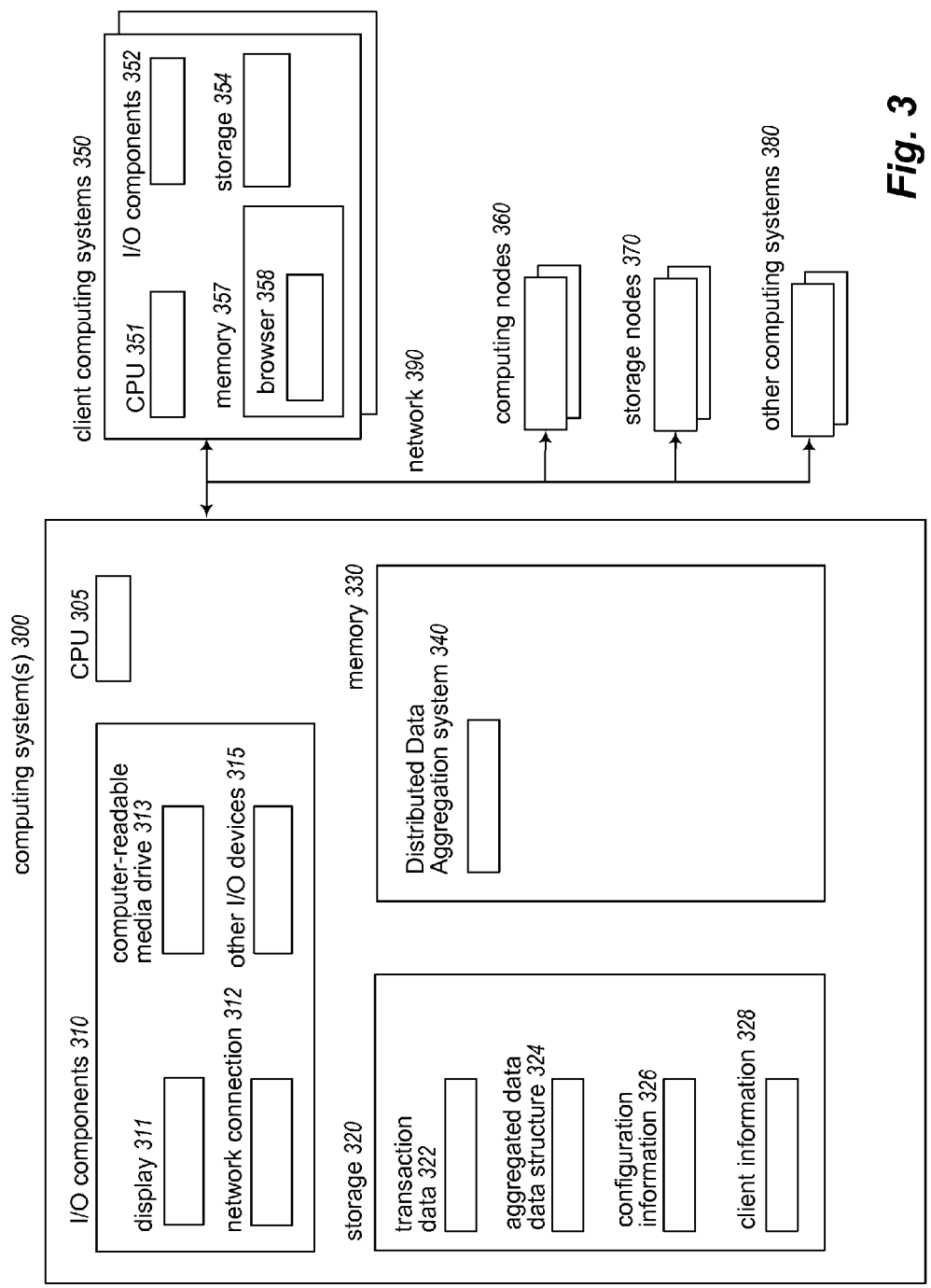
FIG. 3 is a block diagram illustrating an example embodiment of a computing system configured to manage distributed data aggregation.

FIG. 3 is a block diagram illustrating an example embodiment of a system suitable for performing techniques to manage distributed data aggregation operations. In particular, FIG. 3 illustrates one or more computing systems 300 suitable for executing an embodiment of a Distributed Data Aggregation system 340 that provides a distributed data aggregation service to remote clients, as well as various clients computing systems 350, computing nodes 360, storage nodes 370 and other computing systems 380. In the illustrated embodiment, each computing system 300 has components that include one or more CPU processors 305, various I/O components 310, storage 320, and memory 330, with the illustrated I/O components including a display 311, a network connection 312, a computer-readable media drive 313, and other I/O devices 315 (e.g., a keyboard, a mouse, speakers, etc.). In addition, the illustrated user computing systems 350 have components similar to those of computing system 300, including a CPU 351, I/O components 352 (although particular components are not illustrated), storage 354, and memory 357. The other computing systems 380, computing nodes 360 and/or storage nodes 370 may also each include similar components to some or all of the components illustrated with respect to computing system 300, but such components are not illustrated in this example for the sake of brevity. In addition, the computing nodes 360 may be of multiple types in at least some embodiments, including of multiple resource configuration types, and/or may be available from multiple sources, as discussed in greater detail elsewhere.

An embodiment of the Distributed Data Aggregation system 340 is executing in memory 330, such as under control of CPU processor(s) 305 as programmed with software instructions of the system 340, and it interacts with computing systems 350 and 380, computing nodes 360 and storage nodes 370 over the network 390 (e.g., via the Internet and/or the World Wide Web, via a private cellular network, etc.). In this example embodiment, the DDA system 340 includes functionality related to managing distributed data aggregation operations on computing nodes 360 by various users (not shown) who are interacting with client computing systems 350, such as in conjunction with a network-accessible DDA service provided by the DDA system 340. In addition, the DDA system 340 includes functionality related to managing storage of generated aggregated data values on storage nodes 370 on behalf of various clients, such as in conjunction with a network-accessible DDA service provided by the DDA system 340. The other computing systems 350 and 380, computing nodes 360 and/or storage nodes 370 may be executing various software as part of interactions with the DDA system. For example, client computing systems 350 may each be executing a Web browser 358 or other software in memory 357, such as to configure and/or request data aggregation operations on behalf of particular clients using one or more computing nodes 360 in various ways, to track and optionally request modifications to ongoing distributed data aggregation operations, and/or to perform various other types of actions.

Various information related to the operation of the DDA system 340 may be stored in storage 320, such as information 322 related to input transaction data for one or more clients, information 328 about clients of the distributed data aggregation service, information 324 that includes stored aggregated data in one or more types of data structures (e.g., final execution results from data aggregation operations that have been completed and stored in one or more OLAP cubes), and user-specified and other configuration information 326 used to configure distributed data aggregation operations. As discussed elsewhere, at least some of the illustrated information may be stored in other manners, such as if some or all of the transaction data 322 are stored in a distributed storage system (not shown) provided using various of the computing nodes 360, whether instead of or in addition to storing that information on storage 320. Similarly, some or all of the aggregated data results 324 may be stored in a distributed hash table (not shown) or other distributed key-value storage structure provided using various of the storage nodes 370, whether instead of or in addition to storing that information on storage 320. In addition, in some embodiments other storage systems may be used to provide long-term storage of information for some or all clusters, as described elsewhere, including by using other computing systems 380 and/or other computing nodes/systems or storage nodes/systems (not shown).

After the DDA system 340 receives requests (or other indications) to perform data aggregation operations on one or more computing nodes 360, along with specified configuration information, the DDA system 340 selects the computing nodes for the cluster that will perform the distributed operations, and initiates those distributed operations on at least some of those computing nodes 360 of the cluster, as described in greater detail elsewhere. The DDA system 340 may also dynamically monitor or otherwise interact with one or more of the computing nodes 360 to track use of those computing nodes. The DDA system 340 may also manage the storage of generated aggregated data values in a distributed hash table (not shown) or other distributed key-value storage structure provided using various of the storage nodes 370, as described in greater detail elsewhere.

It will be appreciated that computing systems 300, 350 and 380, computing nodes 360 and storage nodes 370 are merely illustrative and are not intended to limit the scope of the present invention. The computing systems and/or nodes may instead each include multiple interacting computing systems or devices, and the computing systems/nodes may be connected to other devices that are not illustrated, including through one or more networks such as the Internet, via the Web, or via private networks (e.g., mobile communication networks, etc.). More generally, a node or computing system may comprise any combination of hardware that may interact and perform the described types of functionality, optionally when programmed or otherwise configured with particular software instructions and/or data structures, including without limitation desktop or other computers, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated DDA system 340 may in some embodiments be distributed in various modules. Similarly, in some embodiments, some of the functionality of the DDA system 340 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., the distributed data aggregation system) and/or data structures, such as by execution of software instructions of the one or more software programs and/or by storage of such software instructions and/or data structures. Furthermore, in some embodiments, some or all of the systems and/or modules may be implemented or provided in other manners, such as by consisting of one or more means that are implemented at least partially in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4A:
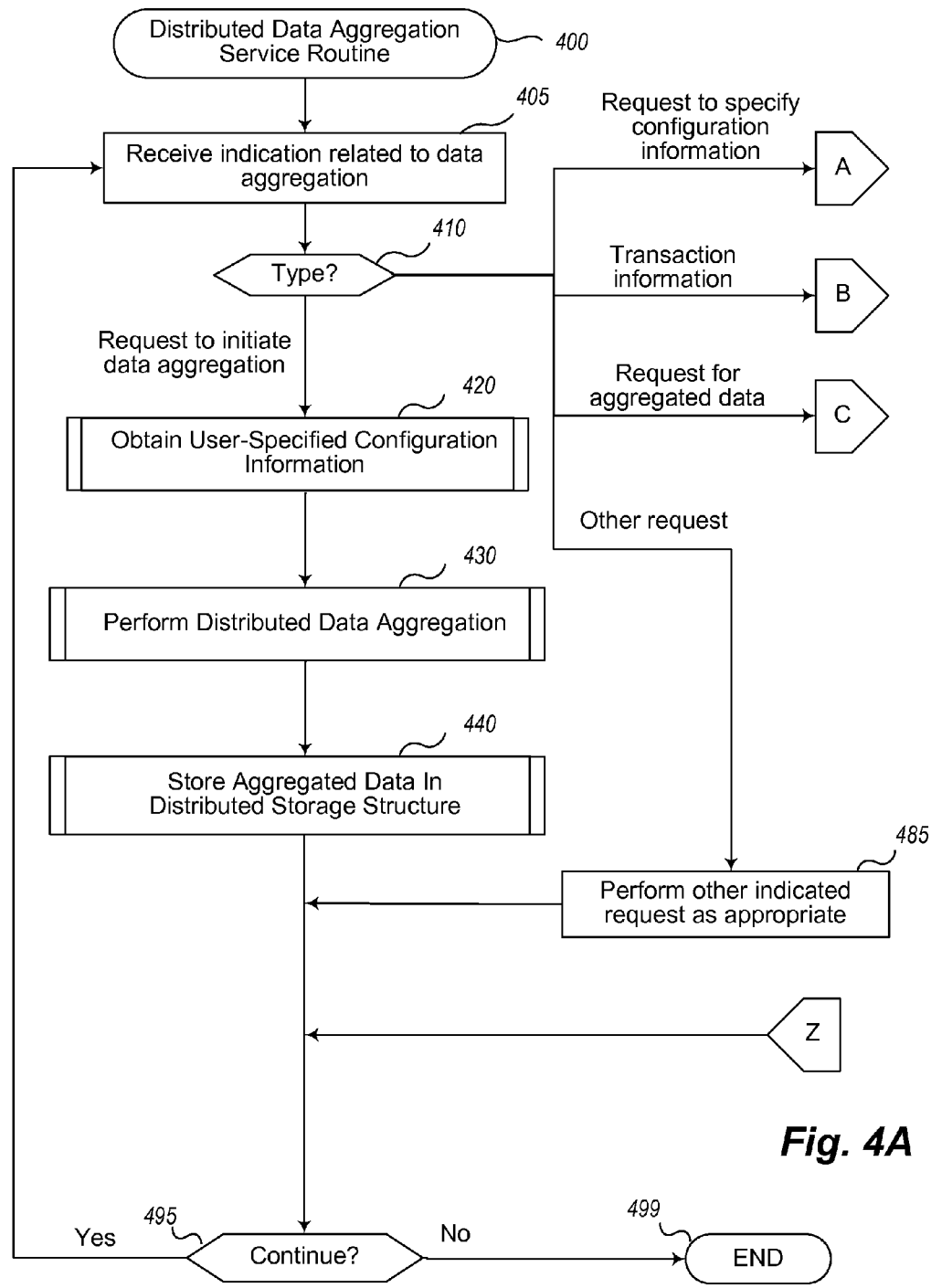
FIGS. 4A-4B illustrate a flow diagram of an example embodiment of a Distributed Data Aggregation Service routine.
Figure 4B:
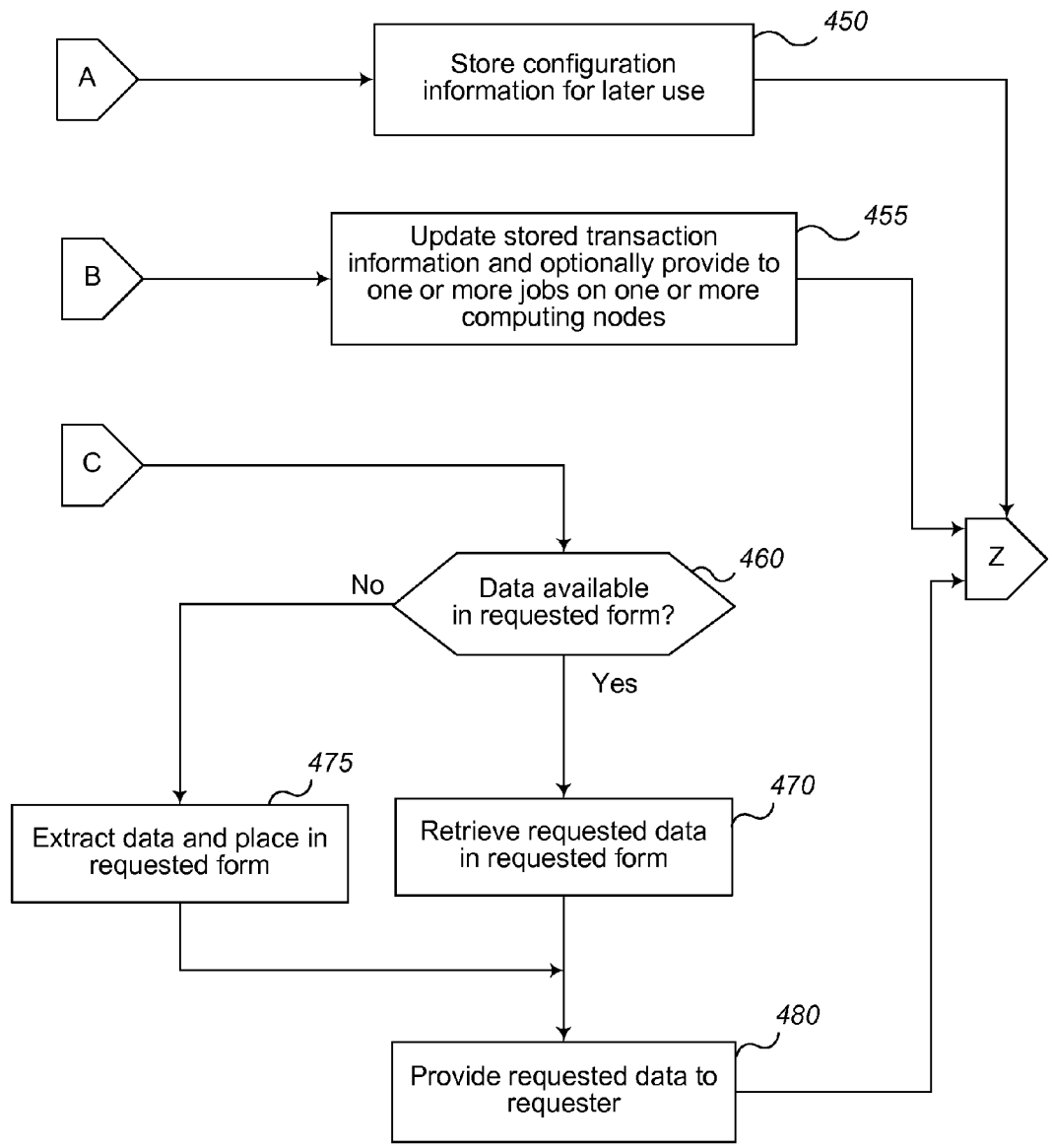

FIGS. 4A-4B are a flow diagram of an example embodiment of a Distributed Data Aggregation Service routine 400. The routine may be provided by, for example, execution of the DDA service modules 110 of FIG. 1, the DDA system 340 of FIG. 3, and/or the DDA service (not shown) that performs the activities described with respect to FIGS. 2A-2H, such as to manage distributed data aggregation operations. In this illustrated embodiment, the routine 400 manages various aspects of use of a DDA service that performs distributed execution of programs on behalf of multiple clients.

In the illustrated embodiment, the routine begins at block 405, where information related to distributed data aggregation operations is received. The routine continues to block 410 to determine the type of received information. If it is determined in block 410 that a request is received to initiate data aggregation operations, such as from a client, the routine continues to block 420 to execute an Obtain User-Specified Configuration Information routine, with one example of such a routine being described in greater detail with respect to FIG. 5. After the configuration information is obtained in block 420, the routine continues to block 430 to execute a Perform Distributed Data Aggregation routine, with one example of such a routine being described in greater detail with respect to FIG. 6. After the data aggregation operations are performed in block 430, the routine continues to block 440 to execute a Store Aggregated Data In Distributed Storage routine, with one example of such a routine being described in greater detail with respect to FIG. 8. While the obtaining of configuration information, performing of distributed data aggregation operations, and storage of aggregated data values in blocks 420-440 are illustrated as being performed in a synchronous manner, such that the routine 400 does not perform other operations during those blocks, it will be appreciated that the routine may continue to perform other operations asynchronously and simultaneously with the actions of blocks 420-440, including to monitor and modify ongoing data aggregation operations with respect to those blocks, as well as to perform other actions with respect to performing data aggregation operations for other clients, as described elsewhere.

If it was instead determined in block 410 that the information received in block 405 was a request to specify configuration information for later use on behalf of a client (e.g., during initial registration operations), the routine instead continues to block 450 to receive and store such configuration information, along with associated administrative information (e.g., information about the client who submitted the information; optionally information about input data to later be used; etc.). In some embodiments, such a request may include a request to schedule later data aggregation operations, such as at an indicated time or when one or more indicated criteria are satisfied (e.g., when sufficient excess computing capacity of the DDA service is available).

If it is instead determined in block 410 that the information received in block 405 is transaction information to use as input for distributed data aggregation operations for a client, the routine continues to block 455 to store the received transaction information. In addition, if distributed data aggregation operations are ongoing for the client on a cluster of computing nodes, the routine may further provide or make available the received transaction information to the computing nodes of the cluster for use.

If it is instead determined in block 410 that the information received in block 405 is a request for aggregated data, such as for a client who previously initiated the generation of that aggregated data with respect to blocks 420 and 430, the routine continues to block 460 to determine if the requested data is currently available in the requested form, such as by being stored in an OLAP cube or other multi-dimensional data structure that has corresponding defined dimensions, dimension categories and metrics. If so, the routine continues to block 470 to retrieve the requested data, and in block 480 provides the requested data to the requester. If not, the routine continues to block 475 and attempts to provide the requested data by retrieving other aggregated data and modifying it to place it in the requested form, and if successful, proceeds to block 480 to provide the requested data. It will be appreciated that requested data may be provided in various formats, including pivot tables and other database view data structures. In other embodiments, the routine 400 may instead cause aggregated data to be stored externally to the data aggregation service, such that clients may access their aggregated data without interacting with the data aggregation service.

If it instead determined in block 410 that the type of information received in block 405 is another type of request, the routine continues instead to block 485 to perform the other indicated request as appropriate. Such other requests may include, for example, administrative operations with respect to clients, such as users registering with the DDA service, users checking account information or other information of the DDA service, users tracking ongoing data aggregation operations (e.g., by receiving some or all information about the intermediate state or other status of one or more of the data aggregation operations), users providing payment with respect to currently or previously requested data aggregation operations or other provided functionality, etc.

After blocks 430, 450, 455, 480, or 485, the routine continues to block 495 to determine whether to continue, such as until an explicit indication to terminate is received (e.g., from an operator of the DDA service). If it is determined to continue, the routine returns to block 405, and if not continues to block 499 and ends.

Figure 5:
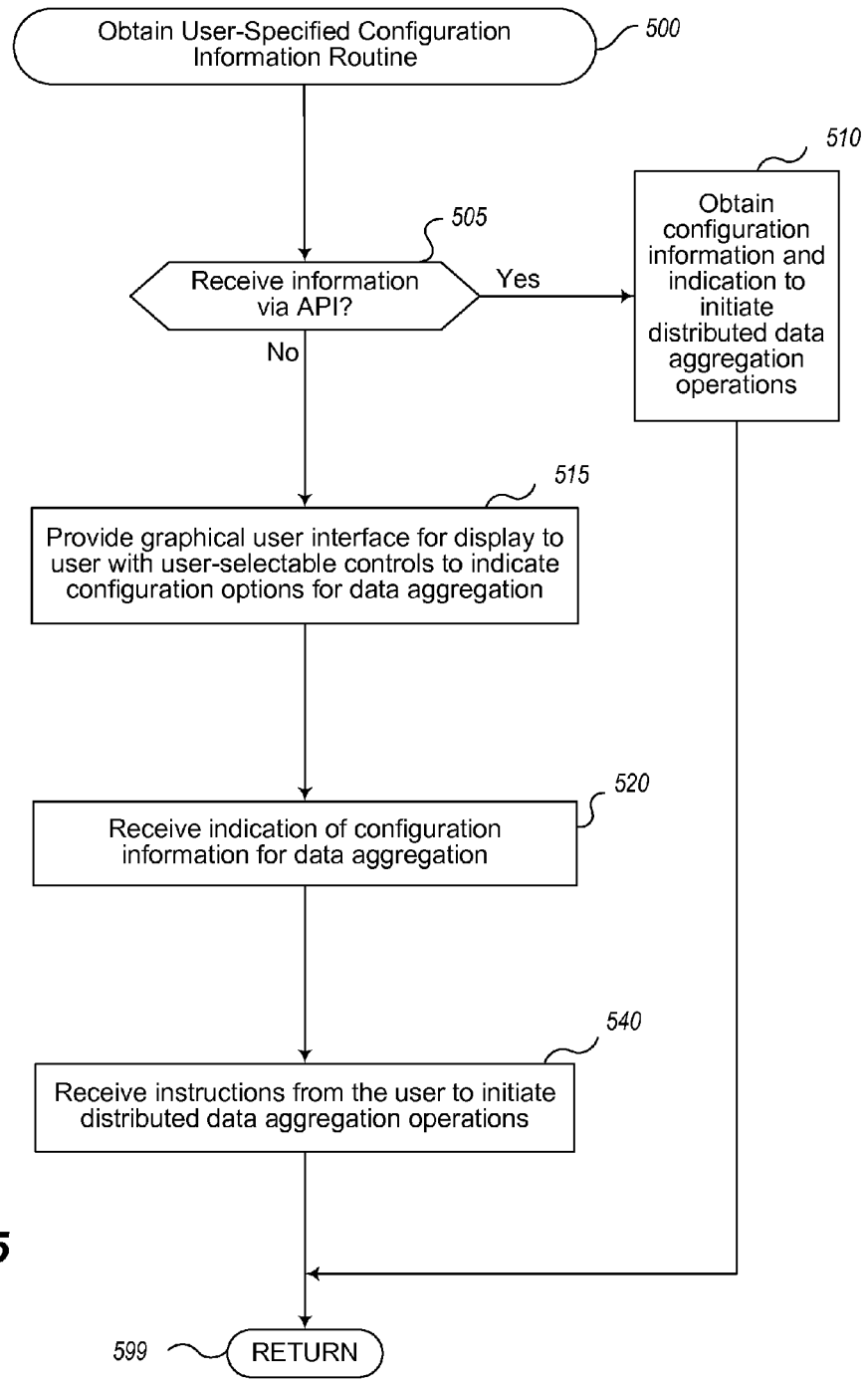
FIG. 5 illustrates a flow diagram of an example embodiment of a routine for obtaining user-specified data aggregation configuration information.

FIG. 5 is a flow diagram of an example embodiment of an Obtain User-Specified Configuration Information routine 500. The routine may, for example, be initiated by block 420 of FIG. 4A. The routine 500 interacts with users to determine configuration information to be used to perform data aggregation operations in a distributed manner on multiple computing nodes on behalf of an associated client.

The routine begins in block 505, where an indication is received on behalf of a client regarding configuration information to be specified regarding distributed data aggregation operations. If it is determined in block 505 that the received indication is received via an API of the DDA service, the routine continues to block 510 to obtain and stored configuration information via one or more API function calls, and to optionally store and aggregate such information over multiple API function calls. After the various configuration information has been obtained, and an instruction is received via the API to initiate distributed data aggregation operations in accordance with the specified configuration information, the routine in block 510 continues to block 599 and returns, including providing an indication of that specified configuration information and initiation instruction.

If it is instead determined in block 505 that the received indication is not received via an API, such as via a user interaction with a previously provided GUI of the DDA service or instead via a user request to obtain access to such a GUI, the routine continues instead to block 515 to provide (or update as appropriate) a GUI of the DDA service for display to the user, with the initial GUI screen(s) being configured to obtain information about various configuration information for performance of data aggregation operations. In block 520, the routine then receives information from one or more interactions of the user with the displayed GUI that indicates various user-specified configuration information. After the various configuration information has been provided, the routine receives instructions from the user in block 540 to initiate the distributed data aggregation operations in accordance with the specified configuration information, and continues to block 599 and returns, including providing an indication of that specified configuration information and initiation instruction.

While not illustrated here, it will be appreciated that in some embodiments a user may begin the interactions described with respect to FIG. 5, and then decide to explicitly cancel the interactions or otherwise fail to complete the interactions. In such situations, the routine may exit without providing an indication of the initiation instruction (and optionally without any configuration information specified by the user before the cancellation/completion failure), and the routine 400 in FIGS. 4A-4B may instead determine to skip block 430 due to the lack of the initiation instruction.

Figure 6:
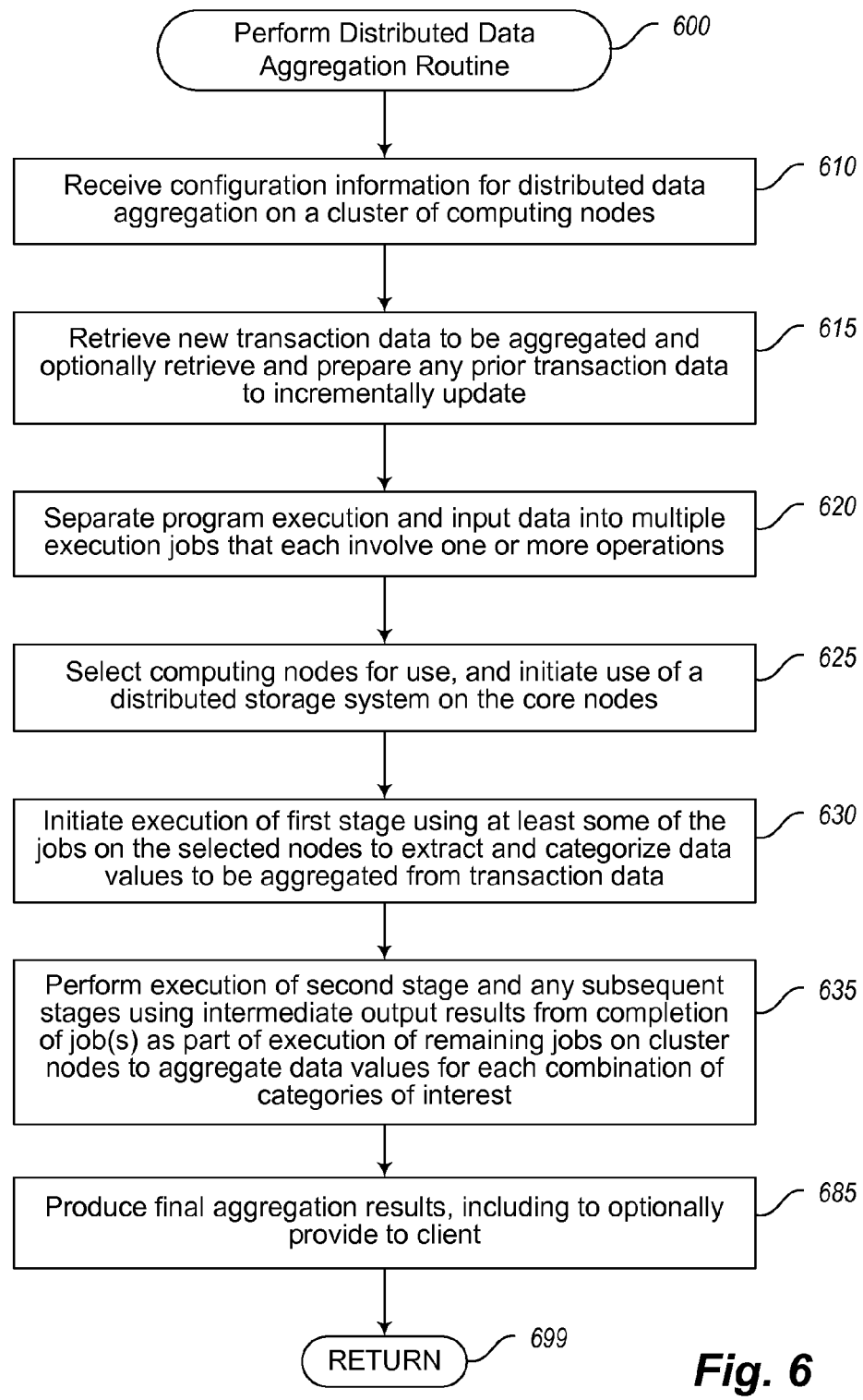
FIG. 6 illustrates a flow diagram of an example embodiment of a routine for performing distributed data aggregation.

FIG. 6 is a flow diagram of an example embodiment of a Perform Distributed Data Aggregation routine 600. The routine may, for example, be initiated by block 430 of FIG. 4A. The routine 600 performs operations to perform data aggregation operations in a distributed manner on multiple computing nodes in accordance with specified configuration information.

The routine begins in block 610, where it receives configuration information for use in performing data aggregation operations, such as from the output of routine 500 of FIG. 5. After block 610, the routine continues to block 615 to obtain new transaction data to be aggregated, such as by retrieving the transaction data from an indicated source location. In situations in which the data aggregation operations include incremental updates to prior aggregated data, the prior aggregated data may further be retrieved and prepared for use. In block 620, the routine then determines how to distribute the data aggregation operations across multiple computing nodes, such as how to separate the input transaction data across a determined quantity of computing nodes to be used in a cluster for the data aggregation operations (e.g., as specified in the received configuration information, or otherwise automatically determined, such as based on preferred or default configuration information, a number of computing nodes that are currently available from the DDA service, an amount of fees paid by a client on whose behalf the request is made, etc.). In block 625, the routine then selects multiple computing nodes to use in the cluster for the client, such as based on the determined quantity. In addition, the routine may further perform the computing node selection based on additional criteria, such as one or more resource configuration types to use, a particular source of the computing nodes to be used, a particular geographical and/or network location of computing nodes to be used, etc. The actions in blocks 620 and 625 may be performed in various manners in various embodiments, as discussed in greater detail elsewhere.

In block 630, the routine then initiates the execution of a first stage using at least some of the cluster computing nodes. In the illustrated embodiment, the first stage includes performing map functions via execution jobs on at least some of the computing nodes in order to extract data values of interest to be aggregated from the various input data, and to emit the extracted data values in a manner that is associated with corresponding combinations of dimension category values. In block 635, the routine then initiates a second stage using at least some of the cluster computing nodes, by using at least some of the intermediate results output data from the first stage as input data. The operations of the second stage in the illustrated embodiment include performing one or more reduce functions via execution jobs to aggregate data values for particular combinations of dimension category values. In any subsequent stages are configured to be performed, such as a third stage with one or more gamma functions, the routine subsequently performs such subsequent stages after a prior stage is sufficiently complete (e.g., after intermediate results output data from the prior stage is available). After block 635, the routine continues to block 685 and provides the final aggregation results, optionally by initiating storage of the final aggregation results in an appropriate multi-dimensional data structure or other data structure. One example of such storage activities is discussed in greater detail with respect to FIG. 8 for distributed storage of an OLAP cube. In some embodiments, the computing nodes may supply such output information back to the routine 400, such as for storage in a long-term storage location of the DDA service, while in other embodiments the output results may instead be stored on the computing nodes (e.g., as part of a distributed storage system on multiple computing nodes), and/or stored by the computing nodes on one or more long-term storage locations remote from the computing nodes. In the illustrated embodiment, blocks 630-635 are illustrated as being performed in a synchronous manner in which the routine 600 waits for execution jobs to complete before performing other actions. It will be appreciated that in other embodiments the routine 600 may operate in other manners, such as in an asynchronous manner to perform other actions with respect to performing the current data aggregation operations and/or to performing other data aggregation operations for other clients. In addition, it will be appreciated that in some situations errors may occur that cause one or more execution jobs to fail to complete, such as due to problems with the computing node on which the execution job is being performed, due to a network connection with the computing node, due to an error in the software corresponding to performing the execution job, due to problems with input data to be used for the performance of the execution job, etc. In such situations, the routine may take various actions to correct the errors (e.g., by transferring the execution job to another computing node), but if an irreversible error occurs, the routine may terminate the further distributed data aggregation operations or may instead attempt to complete as much of the distributed data aggregation operations as possible and provide incomplete final results along with an indication that the data aggregation operations are completed with errors. After block 685, the routine continues to block 699 and returns.

Figure 7:
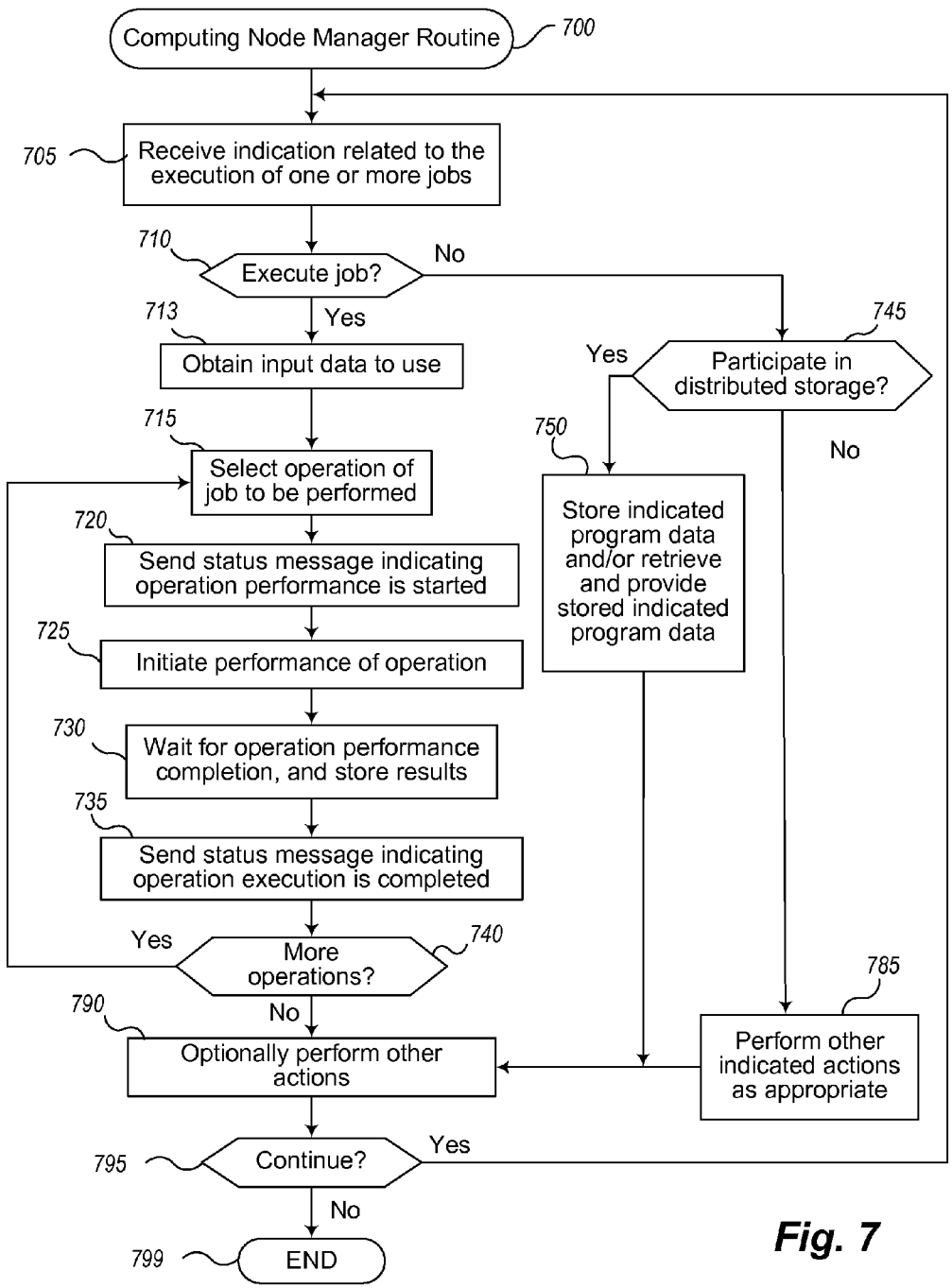
FIG. 7 illustrates a flow diagram of an example embodiment of a Computing Node Manager routine.

FIG. 7 is a flow diagram of an example of a Computing Node Manager routine 700. The routine may be provided by, for example, execution of a software module on a cluster computing node by the distributed data aggregation service. In the illustrated embodiment, the management software on a computing node manages some aspects of the execution of execution jobs on the computing node, while in other embodiments some or all of the functionality described with respect to FIG. 7 may instead be performed by the routine 400 of FIGS. 4A-4B, or instead by an execution job that is being executed on the computing node.

In the illustrated embodiment, the routine begins at block 705, where an indication is received related to the execution of one or more execution jobs on the computing node. The routine continues to block 710 to determine whether the indication is to initiate execution of an indicated execution job. If so, the routine continues to block 713 to obtain the input data to be used for the indicated execution job and to store it locally, and to determine the multiple operations to be performed for the execution job (e.g., based on the information received about the execution job in block 705 or that is otherwise retrieved from an external source). The input data to be used may be obtained in various manners, such as by being received in block 705, already being available on local storage (e.g., if the computing node is a computing node whose local portion of the distributed storage system stores that input data), being retrieved from another computing node that is such a computing node (e.g., if the current computing node does not store that input data), etc. After block 713, the routine continues to block 715 to select the next operation to be performed, beginning with the first. Blocks 715-740 are illustrated in this example embodiment as being performed in a serial manner, such that each operation is individually performed in a synchronous manner before the next operation is initiated, although it will be appreciated that in other embodiments the operations may be performed in other manners, such as to execute some or all of the operations in parallel and/or in an asynchronous manner.

After block 715, the routine continues to block 720 to send a status message to the routine 400 indicating that the execution of the selected operation has begun, and in block 725 initiates the performance of the operation. In block 730, the routine waits for the completion of the performance of the operation, and optionally locally stores any intermediate results produced by the operation performance. In block 735, the routine then sends another status message to the routine 400 indicating that the performance of the operation is completed. In block 740, the routine then determines whether there are more operations to be performed, and if so returns to block 715.

If was instead determined in block 710 that the received indication in block 705 was not to execute an execution job, the routine continues to block 745 to determine whether the received indication in block 705 is to perform one or more activities related to participation in a distributed storage system, although such activities may not be performed in some embodiments. If so, the routine continues to block 750 to take actions to perform one or more such activities. The actions may include storing indicated data in a local portion of the distributed storage system and/or retrieving and providing such locally stored data to a requester (e.g., to another computing node with respect to block 713 of a routine performed for that other computing node), and may further include taking various activities to establish the participation of the computing node in the distributed storage system when the use of the cluster is first initiated.

If was instead determined in block 745 that the received indication in block 705 was not to participate in the distributed storage system for the cluster, the routine continues instead to block 785 to perform one or more other indicated operations as appropriate. For example, the information received in block 705 may be a request for status information from the routine 400, and if so block 785 may obtain and provide that status information to the routine 400. Furthermore, in some embodiments and situations, different execution jobs may coordinate in various manners, such as by exchanging information of interest, and the information in block 705 may be such information from another execution job of the program or a request from such other execution job for information from the current execution job.

After blocks 750 or 785, or if it is instead determined in block 740 that there are no more operations to be performed, the routine continues to block 790 to optionally perform one or more other tasks, such as to coordinate with other execution jobs of the program if appropriate, to take administrative actions as part of executing the execution job, etc. After block 790, the routine continues to block 795 to determine whether to continue, such as until an explicit indication to terminate is received (e.g., from the routine 400 or from a human operator of the DDA service). If it is determined to continue, the routine returns to block 705, and if not continues to block 799 and ends.

Figure 8:
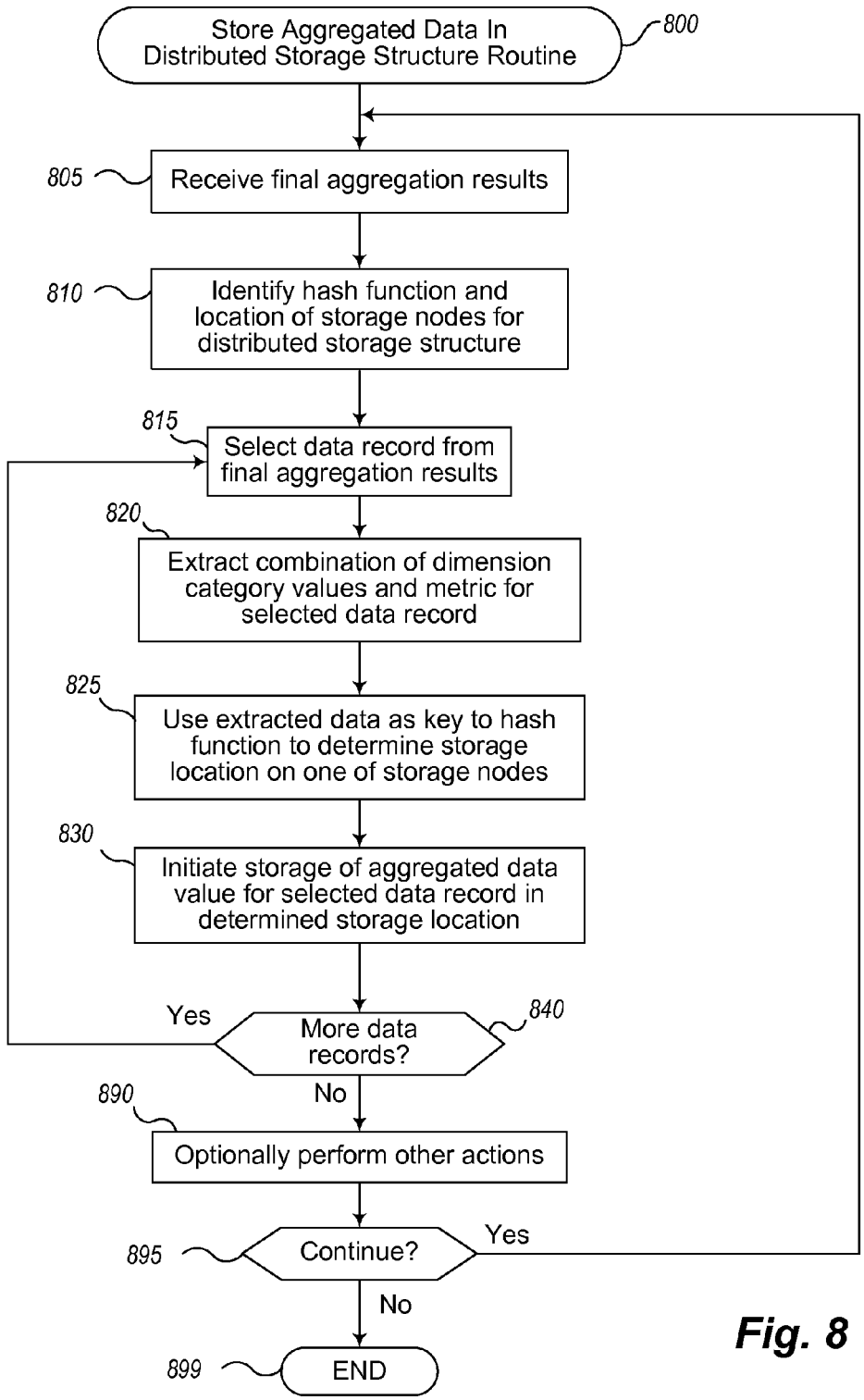
FIG. 8 illustrates a flow diagram of an example embodiment of a Store Aggregated Data In Distributed Storage Structure routine.

FIG. 8 is a flow diagram of an example embodiment of a Distributed Data Aggregation Storage 800. The routine may be initiated, for example, by block 440 of FIG. 4A. The routine 800 performs operations to store aggregated data values in a distributed manner on multiple storage nodes in accordance with specified configuration information. In the illustrated embodiment, the multiple storage nodes may provide a distributed hash table, and the aggregated data values may be generated for an OLAP cube that is stored in a distributed manner in the distributed hash table, but in other embodiments other types of aggregated data and distributed key-value storage structures may be used.

In the illustrated embodiment, the routine begins at block 805, where final aggregation results are received, such as from the output of block 430 of FIG. 4A. The routine continues to block 810 to identify a hash function to use and information about the location of distributed storage on storage nodes that are being used. After block 810, the routine continues to block 815 to select the next output data record from the final aggregation results, beginning with the first. Blocks 815-840 are illustrated in this example embodiment as being performed in a serial manner, such that each output data record is individually assessed in a synchronous manner before the next output data record is assessed, although it will be appreciated that in other embodiments the output data records may be performed in other manners, such as to assess some or all of the output data records in parallel and/or in an asynchronous manner.

After block 815, the routine continues to block 820 to determine a key value to use for the selected data record, which in the illustrated embodiment is a combination of the dimension category values and metric for the selected data record. In block 825, the routine then uses the key value as a hash for the identified hash function, in order to determine a hashed output value that corresponds to a storage location in the distributed storage structure. In block 830, the routine then initiates the storage of at least the aggregated data value(s) for the selected data record at the storage location determined in block 825. In block 840, the routine then determines whether there are more output data records to be assessed, and if so returns to block 815.

If it is instead determined in block 840 that there are no more output data records to be assessed, the routine continues to block 890 to optionally perform one or more other actions, such as to coordinate with other instances of the routine 800 if appropriate (e.g., if the storage operations are performed in a distributed manner by multiple instances of the routine 800 for different sets of aggregated data values), to take administrative actions related to storing the aggregated data, to notify a corresponding client when the storing is completed, etc. After block 890, the routine continues to block 895 to determine whether to continue, such as until an explicit indication to terminate is received (e.g., from a human operator of the DDA service). If it is determined to continue, the routine returns to block 805, and if not continues to block 899 and ends.

In addition, in some embodiments, a distributed hash table or other distributed key-value storage structure may be created and/or maintained in a manner that includes replication, such as to enhance reliability and availability. For example, in some such embodiments, each storage node used for the distributed key-value storage structure may include one or more other backup storage nodes that store additional copies of the data for that storage node, such as to enable a backup storage node to replace a primary storage node that it backs up if the primary storage node fails or otherwise becomes unavailable. More generally, in some embodiments, each group of data stored in the distributed key-value storage structure may include multiple copies, such as with a primary copy and one or more backup copies—in such embodiments, a particular storage node that is providing the distributed key-value storage structure may store the primary copies of some stored data and the backup copies of other stored data. In some embodiments with replication being provided for the distributed key-value storage structure, the distributed key-value storage structure may manage the replication and related operations on its own, such that the routine 800 of FIG. 8 merely stores a single copy of a group of data (e.g., a primary copy), and a management module for the distributed key-value storage structure creates and maintains additional copies. In other embodiments, the routine 800 may perform at least some such replication, such as by storing multiple copies of a particular group of data in block 830, by initiating periodic replication activities with respect to block 890, etc.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:
generating, by one or more configured computing nodes of a data aggregation service, an OLAP ("online analytical processing") cube having a plurality of aggregated data values, wherein each of the aggregated data values is associated with a combination of multiple dimension category values for multiple dimensions of the OLAP cube, and wherein the generating of the OLAP cube is performed using configuration information specified by a client of the data aggregation service and includes performing multiple stages having distinct indicated activities; and
after the generating of the OLAP cube, initiating, by the one or more configured computing nodes, storing the plurality of aggregated data values for the OLAP cube in a distributed hash table having a plurality of storage locations on multiple storage nodes that are each available to store information for a key-value pair by, for each of the plurality of aggregated data values:
determining a hash key value associated with the aggregated data value based at least in part on the combination of multiple dimension category values associated with the aggregated data value;
determining a storage location within the distributed hash table by using the determined hash key value as input to a hash function, the determined storage location being one of the plurality of storage locations and being on one of the multiple storage nodes; and
providing the aggregated data value for storage in the determined storage location on the one storage node as part of the OLAP cube.

2. The method of claim 1 further comprising, after the storing of the plurality of aggregated data values for the OLAP cube in the distributed hash table:
receiving a request for one or more aggregated data values stored for the OLAP cube, the request being based on one or more dimension category values for the multiple dimensions of the OLAP cube; and
obtaining the one or more aggregated data values from the distributed hash table to provide in response to the request.

3. The method of claim 2 wherein the obtaining of the one or more aggregated data values from the distributed hash table includes:
identifying one or more values corresponding to the one or more dimension category values to be used as keys for the one or more aggregated data values; and
for each of the identified values,
determining a storage location within the distributed hash table by using the identified value as input to the hash function; and
using the determined storage location to obtain an aggregated data value stored at the determined storage location.

4. The method of claim 2 further comprising generating a pivot table that includes at least the obtained one or more aggregated data values, and providing the generating pivot table in response to the request.

5. The method of claim 1 wherein each of the plurality of aggregated data values is further associated with one of one or more metrics, and wherein the determining of the hash key value associated with each of the aggregated data values is further based in part on the associated metric for the aggregated data value.

6. The method of claim 5 wherein the one or more metrics include multiple metrics, and wherein each of the plurality of aggregated data values is part of an output data record that includes the aggregated data value and that includes an indication of the associated metric for the aggregated data value.

7. The method of claim 1 wherein each of the plurality of aggregated data values is part of an output data record that includes the aggregated data value and that includes indications of the multiple dimension category values for the combination associated with the aggregated data value.

8. The method of claim 1 wherein the hash function is one of a MD5 hash algorithm and a SHA-1 hash algorithm.

9. The method of claim 1 wherein the generating of the OLAP cube includes generating, by the data aggregation service on behalf of the client, the plurality of aggregated data values for the OLAP cube, and wherein the multiple storage nodes are external to the data aggregation service and are provided by the client.

10. The method of claim 1 wherein the generating of the OLAP cube includes generating, by the data aggregation service on behalf of the client, the plurality of aggregated data values for the OLAP cube, and wherein the multiple storage nodes are part of an online storage service that is external to the data aggregation service and is accessible to the client.

11. The method of claim 1 wherein the generating of the OLAP cube includes generating, by the data aggregation service on behalf of the client, the plurality of aggregated data values for the OLAP cube, and wherein the multiple storage nodes are provided by the data aggregation service.

12. The method of claim 11 wherein the one or more configured computing nodes include multiple computing nodes of the data aggregation service that are configured to perform one or more specified map functions as part of a first stage of the multiple stages and include at least one computing node of the data aggregation service that are configured to perform one or more specified reduce functions as part of a second stage of the multiple stages, and wherein the multiple storage nodes are part of the multiple computing nodes.

13. The method of claim 1 wherein the generating of the OLAP cube includes generating, by the data aggregation service on behalf of the client, the plurality of aggregated data values for the OLAP cube, and wherein the initiating of the storing of the plurality of aggregated data values for the OLAP cube in the distributed hash table is performed in a manner based on the configuration information specified by the client.

14. The method of claim 1 wherein, for each of the plurality of aggregated data values, the providing of the aggregated data value for storage in the determined storage location on the one storage node includes storing the aggregated data value and indications of the multiple dimension category values associated with the aggregated data value in the determined storage location, and wherein each of the multiple storage nodes stores at least one of the plurality of aggregated data values.

15. The method of claim 1 further comprising:
determining that multiple of the plurality of aggregated data values have distinct determined storage locations on a single one of the multiple storage nodes; and
accumulating information for each of the multiple aggregated data values, and
wherein, for each of the multiple aggregated data values, the providing of the aggregated data value for storage in the determined storage location on the one storage node includes performing a single loading of the accumulated information to the single one storage node for storage in the distinct determined storage locations for the multiple aggregated data values.

16. A non-transitory computer-readable medium having stored contents that configure one or more computing systems of a data aggregation service to:
generate, by the configured one or more computing systems, a plurality of aggregated data values for an OLAP ("online analytical processing") cube, wherein each of the aggregated data values is associated with a combination of multiple dimension category values for multiple dimensions, and wherein the generating of the OLAP cube is performed using configuration information specified by a client of the data aggregation service; and
initiate storing the plurality of aggregated data values of the generated OLAP cube in a distributed hash table having a plurality of storage locations on multiple storage nodes by, for each of the plurality of aggregated data values:
determining, for use as a key for the aggregated data value, a value associated with the aggregated data value, wherein the determined value is based at least in part on the combination of multiple dimension category values associated with the aggregated data value;
determining a storage location within the distributed hash table by using the determined value as input to a hash function, the determined storage location being one of the plurality of storage locations and being on one of the multiple storage nodes; and
providing the aggregated data value for storage in the determined storage location on the one storage node.

17. The non-transitory computer-readable medium of claim 16 wherein the generating of the plurality of aggregated data values is performed as part of generating the OLAP cube, and wherein the generating of the OLAP cube is performed before the initiating storing of the plurality of aggregated data values in the distributed hash table.

18. The non-transitory computer-readable medium of claim 17 wherein the generating of the plurality of aggregated data values includes performing multiple stages having distinct indicated activities, the multiple stages including a first stage having one or more specified map functions and including at least a second stage having one or more specified reduce functions.

19. The non-transitory computer-readable medium of claim 16 wherein the stored contents are instructions that, when executed, program at least one of the configured one or more computing systems.

20. A system, comprising:
one or more processors of one or more computing systems; and
a data aggregation system that is configured to, when executed by at least one of the one or more processors, provide a data aggregation service that stores a plurality of aggregated data values for an OLAP ("online analytical processing") cube having multiple dimensions using configuration information specified by a client of the data aggregation service, the storing of the plurality of aggregated data values including, for each of the plurality of aggregated data values:
determining a value associated with the aggregated data value for use as a key for the aggregated data value, the determined value being based at least in part on a combination of multiple dimension category values that are associated with the aggregated data value and that correspond to the multiple dimensions;
determining a storage location within a key-value storage structure stored across multiple storage nodes by using the determined value as input to a hash function, the determined storage location being part of a subset of the key-value storage structure on one of the multiple storage nodes; and
providing the aggregated data value for storage in the determined storage location on the one storage node as part of the OLAP cube.

21. The system of claim 20 wherein the data aggregation system is further configured to generate the plurality of aggregated data values from a plurality of input data groups, the generating of the plurality of aggregated data values including using a first stage having one or more specified map functions and using at least a second stage having one or more specified reduce functions.

22. The system of claim 20 further comprising the multiple storage nodes, and wherein the data aggregation system is further configured to create the key-value storage structure on the multiple storage nodes as a distributed key-value storage structure that uses key-value pairs.

23. The system of claim 20 further comprising the one or more computing systems, and wherein the data aggregation system includes software instructions for execution by at least one of the one or more processors.

24. The system of claim 20 wherein the data aggregation system consists of one or more means for performing the providing of the data aggregation service that stores the plurality of aggregated data values for the OLAP cube.

25. The system of claim 20 wherein the key-value storage structure is a distributed hash table having a plurality of storage locations on the multiple storage nodes that are each available to store information for a key-value pair.

26. The system of claim 20 wherein the key-value storage structure is a distributed hierarchical tree structure that includes a plurality of storage locations, and wherein the determining of the storage location by using the determined value as input to the hash function includes:
   identifying multiple storage locations based on output of the hash function, the multiple storage locations being a subset of the plurality of storage locations; and
   selecting one of the multiple storage locations as the determined storage location, the selected one storage location being available to store information for at least one key-value pair.

* * * * *